United States Patent
Kim et al.

(10) Patent No.: US 11,425,643 B2
(45) Date of Patent: Aug. 23, 2022

(54) METHOD FOR PERFORMING COMMUNICATION IN WIRELESS LAN SYSTEM, AND WIRELESS TERMINAL USING SAME

(71) Applicant: LG Electronics Inc., Seoul (KR)

(72) Inventors: Jeongki Kim, Seoul (KR); Kiseon Ryu, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/759,585

(22) PCT Filed: Feb. 7, 2019

(86) PCT No.: PCT/KR2019/001513
§ 371 (c)(1),
(2) Date: Apr. 27, 2020

(87) PCT Pub. No.: WO2019/156473
PCT Pub. Date: Aug. 15, 2019

(65) Prior Publication Data
US 2020/0367157 A1  Nov. 19, 2020

Related U.S. Application Data

(60) Provisional application No. 62/628,293, filed on Feb. 9, 2018.

(51) Int. Cl.
*H04W 52/02* (2009.01)
*H04W 84/12* (2009.01)

(52) U.S. Cl.
CPC ............ *H04W 52/02* (2013.01); *H04W 84/12* (2013.01)

(58) Field of Classification Search
CPC ...... H04W 52/02; H04W 84/12; Y02D 30/70; H04L 27/02
See application file for complete search history.

(56) References Cited

U.S. PATENT DOCUMENTS

| | | | |
|---|---|---|---|
| 2010/0261429 A1* | 10/2010 | Batra | H04W 4/80 455/41.2 |
| 2011/0194471 A1 | 8/2011 | Kim et al. | |
| 2016/0337973 A1 | 11/2016 | Park et al. | |
| 2016/0374020 A1 | 12/2016 | Azizi et al. | |
| 2017/0111858 A1* | 4/2017 | Azizi | H04L 27/261 |
| 2018/0227070 A1* | 8/2018 | Suh | H04J 13/004 |
| 2018/0310249 A1* | 10/2018 | Wilhelmsson | H04W 52/0241 |

FOREIGN PATENT DOCUMENTS

WO  WO2016/028692  2/2016

OTHER PUBLICATIONS

Po-Kai Huang, Intel, IEEE 802.11-17/057r8, Wireless LANs, Specification Framework for TGba, pp. 10-11 (Year: 2017).*
Asterjadhi et al., "Considerations on WUR frame format", Qualcomm Inc, Jul. 2017, 26 pages.

* cited by examiner

*Primary Examiner* — Mohammad S Anwar
(74) *Attorney, Agent, or Firm* — Fish & Richardson P.C.

(57) ABSTRACT

A method for communication performed by a first wireless terminal in a WLAN system according to an embodiment includes: generating a wake-up packet modulated by an on-off keying (OOK) scheme, the wake-up packet including a frame check sequence (FCS) field having a fixed length regardless of a length of the wake-up packet, and the fixed length being two bytes; and transmitting the wake-up packet.

2 Claims, 23 Drawing Sheets

FIG. 1
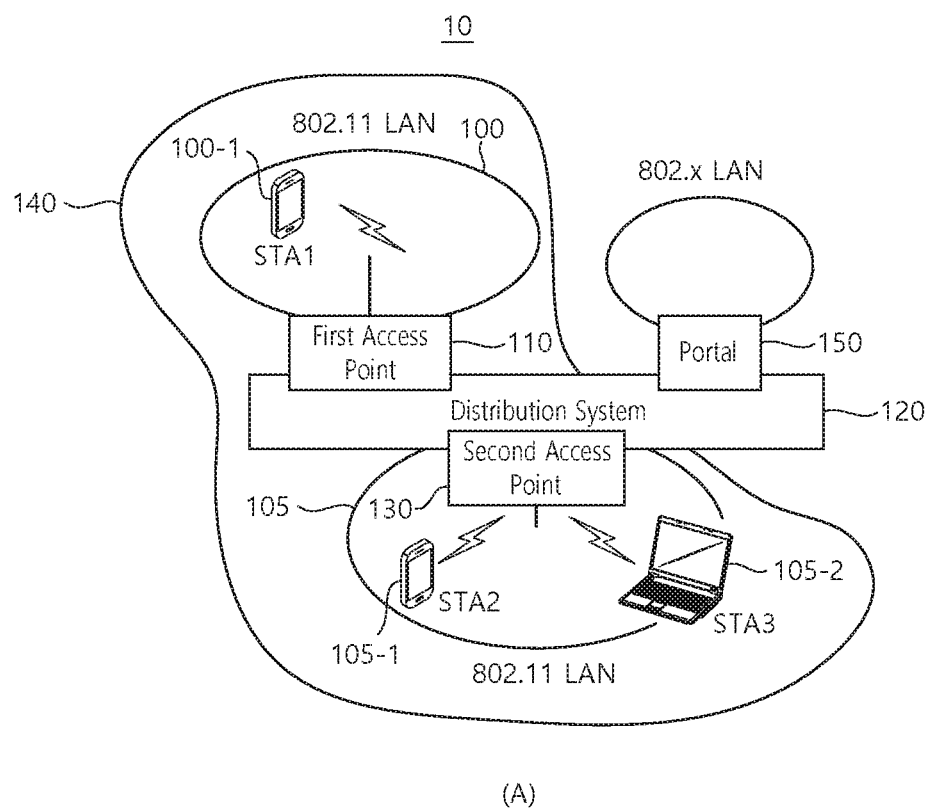
(A)
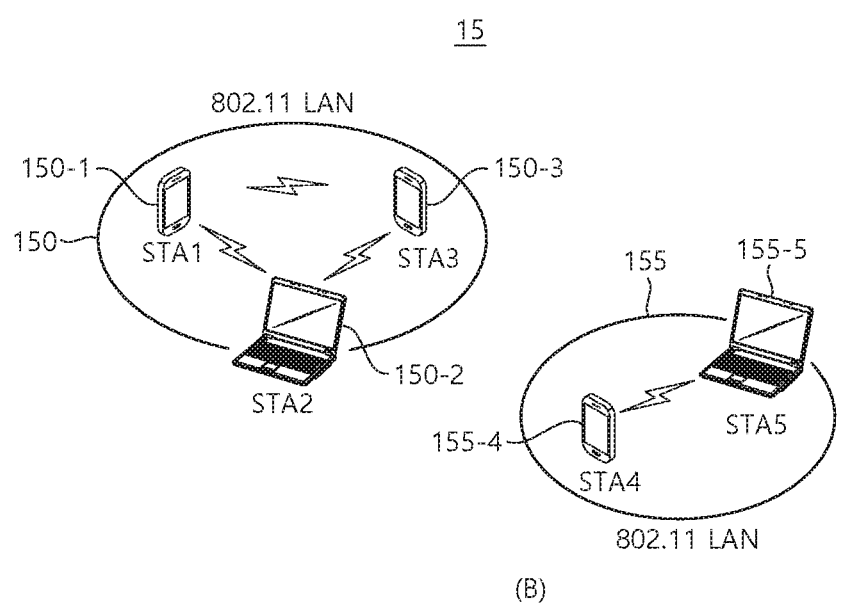
(B)

METHOD FOR PERFORMING COMMUNICATION IN WIRELESS LAN SYSTEM, AND WIRELESS TERMINAL USING SAME

CROSS-REFERENCE TO RELATED APPLICATIONS

This application is a National Stage application under 35 U.S.C. § 371 of International Application No. PCT/KR2019/001513, filed on Feb. 7, 2019, which claims the benefit of U.S. Provisional Application No. 62/628,293 filed on Feb. 9, 2018. The disclosures of the prior applications are incorporated by reference in their entirety.

BACKGROUND

Field

The disclosure relates to wireless communication and, more particularly, to a method for communication in a wireless local area network system and a wireless terminal using the same.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

SUMMARY

An aspect of the disclosure is to provide a method for communication in a wireless local area network (WLAN) system having improved performance and a wireless terminal using the same.

A method for communication performed by a first wireless terminal in a WLAN system according to an embodiment includes: generating a wake-up packet modulated by an on-off keying (OOK) scheme, the wake-up packet including a frame check sequence (FCS) field having a fixed length regardless of a length of the wake-up packet, and the fixed length being two bytes; and transmitting the wake-up packet.

According to an embodiment of the disclosure, there is provided a method for communication in a wireless local area network (WLAN) system having improved performance and a wireless terminal using the same.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
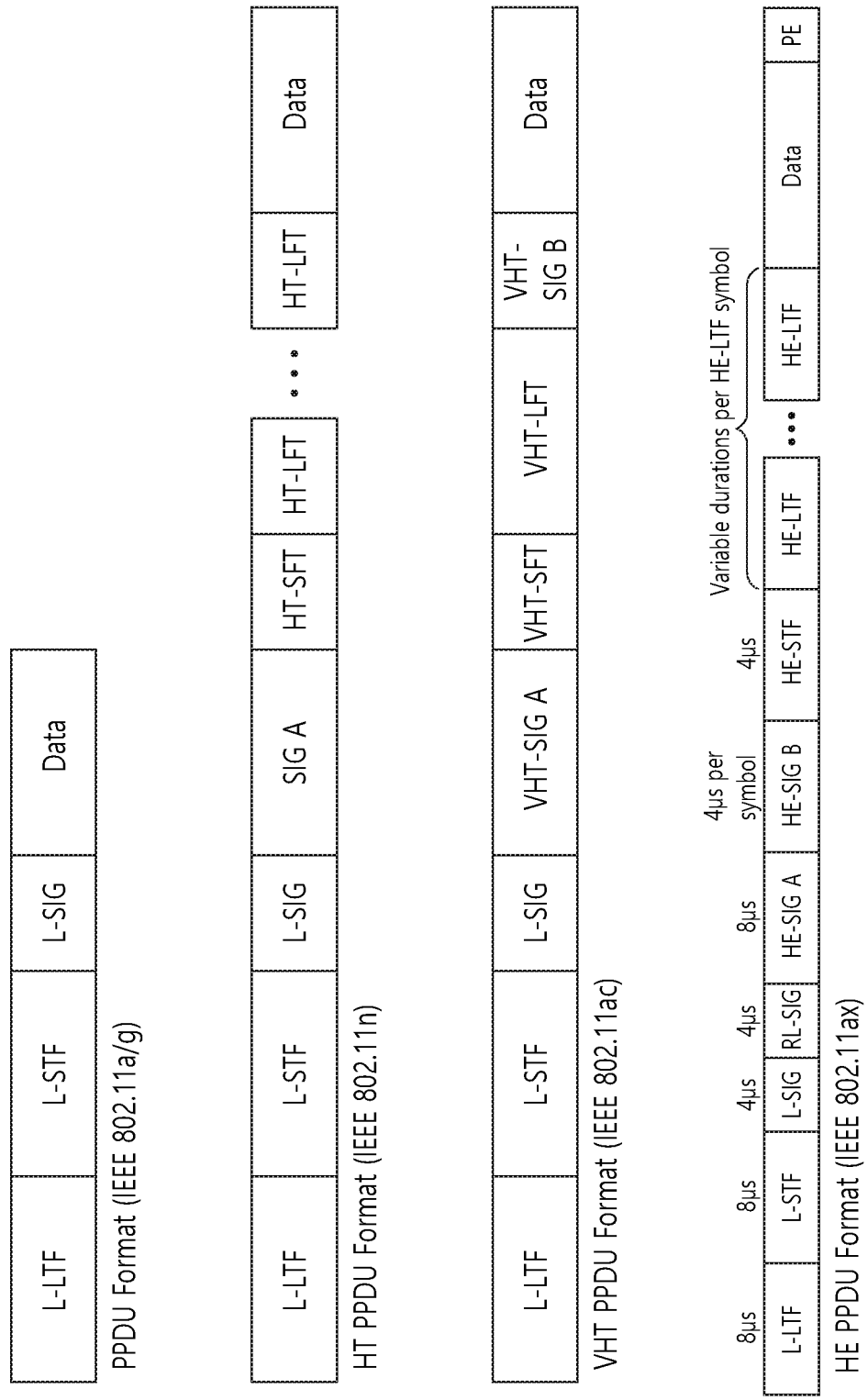
FIG. 2 is a diagram illustrating an example of a physical protocol data unit (PPDU) used in an electrical and electronics engineers (IEEE) standard.

The above-described features and the following detailed description are exemplary contents for helping a description and understanding of the present specification. That is, the present specification is not limited to this embodiment and may be embodied in other forms. The following embodiments are merely examples to fully disclose the present specification, and are descriptions to transfer the present specification to those skilled in the art. Therefore, when there are several methods for implementing components of the present specification, it is necessary to clarify that the present specification may be implemented with a specific one of these methods or equivalent thereof.

In the present specification, when there is a description in which a configuration includes specific elements, or when there is a description in which a process includes specific steps, it means that other elements or other steps may be further included. That is, the terms used in the present specification are only for describing specific embodiments and are not intended to limit the concept of the present specification. Furthermore, the examples described to aid the understanding of the present specification also include complementary embodiments thereof.

The terms used in the present specification have the meaning commonly understood by one of ordinary skill in the art to which the present specification belongs. Terms commonly used should be interpreted in a consistent sense in the context of the present specification. Further, terms used in the present specification should not be interpreted in an idealistic or formal sense unless the meaning is clearly defined. Hereinafter, embodiments of the present specification will be described with reference to the accompanying drawings.

FIG. 1 is a conceptual diagram illustrating a structure of a WLAN system. FIG. 1(A) illustrates a structure of an infrastructure network of institute of electrical and electronic engineers (IEEE) 802.11.

Referring to FIG. 1(A), a WLAN system 10 of FIG. 1(A) may include at least one basic service set (hereinafter, referred to as 'BSS') 100 and 105. The BSS is a set of access points (hereinafter, APs) and stations (hereinafter, STAs) that can successfully synchronize and communicate with each other and is not a concept indicating a specific area.

For example, a first BSS 100 may include a first AP 110 and one first STA 100-1. A second BSS 105 may include a second AP 130 and one or more STAs 105-1 and 105-2.

The infrastructure BSSs 100 and 105 may include at least one STA, APs 110 and 130 for providing a distribution service, and a distribution system (DS) 120 for connecting a plurality of APs.

The DS 120 may connect a plurality of BSSs 100 and 105 to implement an extended service set (hereinafter, 'ESS') 140. The ESS 140 may be used as a term indicating one network to which at least one AP 110 and 130 is connected through the DS 120. At least one AP included in one ESS 140 may have the same service set identification (hereinafter, SSID).

A portal 150 may serve as a bridge for connecting a WLAN network (IEEE 802.11) with another network (e.g., 802.X).

In a WLAN having a structure as illustrated in FIG. 1(A), a network between the APs 110 and 130 and a network between APs 110 and 130 and STAs 100-1, 105-1, and 105-2 may be implemented.

FIG. 1(B) is a conceptual diagram illustrating an independent BSS. Referring to FIG. 1(B), a WLAN system 15 of FIG. 1(B) may perform communication by setting a network between STAs without the APs 110 and 130, unlike FIG. 1(A). A network that performs communication by setting a network even between STAs without the APs 110 and 130 is defined to an ad-hoc network or an independent basic service set (hereinafter, 'BSS').

Referring to FIG. 1(B), an IBSS 15 is a BSS operating in an ad-hoc mode. Because the IBSS does not include an AP, there is no centralized management entity. Therefore, in the IBSS 15, STAs 150-1, 150-2, 150-3, 155-4, and 155-5 are managed in a distributed manner.

All STAs 150-1, 150-2, 150-3, 155-4, and 155-5 of the IBSS may be configured with mobile STAs, and access to a distributed system is not allowed. All STAs of the IBSS form a self-contained network.

The STA described in the present specification is a random function medium including a medium access control (hereinafter, MAC) following a standard of the Institute of Electrical and Electronics Engineers (IEEE) 802.11 standard and a physical layer interface for a wireless medium and may broadly be used as a meaning including both an AP and a non-AP station (STA).

The STA described in the present specification may also be referred to as various names such as a mobile terminal, a wireless device, a wireless transmit/receive unit (WTRU), a user equipment (UE), a mobile station (MS), a mobile subscriber unit, or simply a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

The present embodiment proposes an improved scheme for a signal (or control information field) used for a data field of a PPDU. The signal mentioned in the present embodiment may be applied onto high efficiency PPDU (HE PPDU) according to an IEEE 802.11ax standard. The signal mentioned in the present specification may be HE-SIG-A and/or HE-SIG-B included in the HE PPDU. For example, the HE-SIG-A and the HE-SIG-B may also be respectively represented as SIG-A and SIG-B. However, the signal mentioned in the present specification is not necessarily limited to an HE-SIG-A and/or HE-SIG-B standard and may be applied to control/data fields having various names, which include control information in a wireless communication system transferring user data.

In addition, the HE PPDU of FIG. 2 is an example of a PPDU for multiple users. The HE-SIG-B may be included only when the PPDU is for multiple users. The HE SIG-B may be omitted in a PPDU for a single user.

As illustrated, the HE-PPDU for multiple users (MUs) may include various fields such as legacy-short training field (L-STF), legacy-long training field (L-LTF), legacy-signal (L-SIG), high efficiency-signal A (HE-SIG A), high efficiency-signal-B (HE-SIG B), high efficiency-short training field (HE-STF), high efficiency-long training field (HE-LTF), data field (alternatively, a MAC payload), and packet extension (PE). Each of the fields may be transmitted during an illustrated time period (that is, 4 or 8 μs).

The PPDU used in the IEEE standard is mainly described as a PPDU structure transmitted with a channel bandwidth of 20 MHz. The PPDU structure transmitted with a bandwidth (e.g., 40 MHz and 80 MHz) wider than the channel bandwidth of 20 MHz may be a structure in which linear scaling is applied to the PPDU structure used in the channel bandwidth of 20 MHz.

The PPDU structure used in the IEEE standard may be generated based on 64 Fast Fourier Transforms (FTFs), and a cyclic prefix portion (CP portion) may be ¼. In this case, a length of an effective symbol interval (or FFT interval) may be 3.2 us, a CP length may be 0.8 us, and symbol duration may be 4 us (3.2 us+0.8 us) that adds the effective symbol interval and the CP length.

Figure 3:
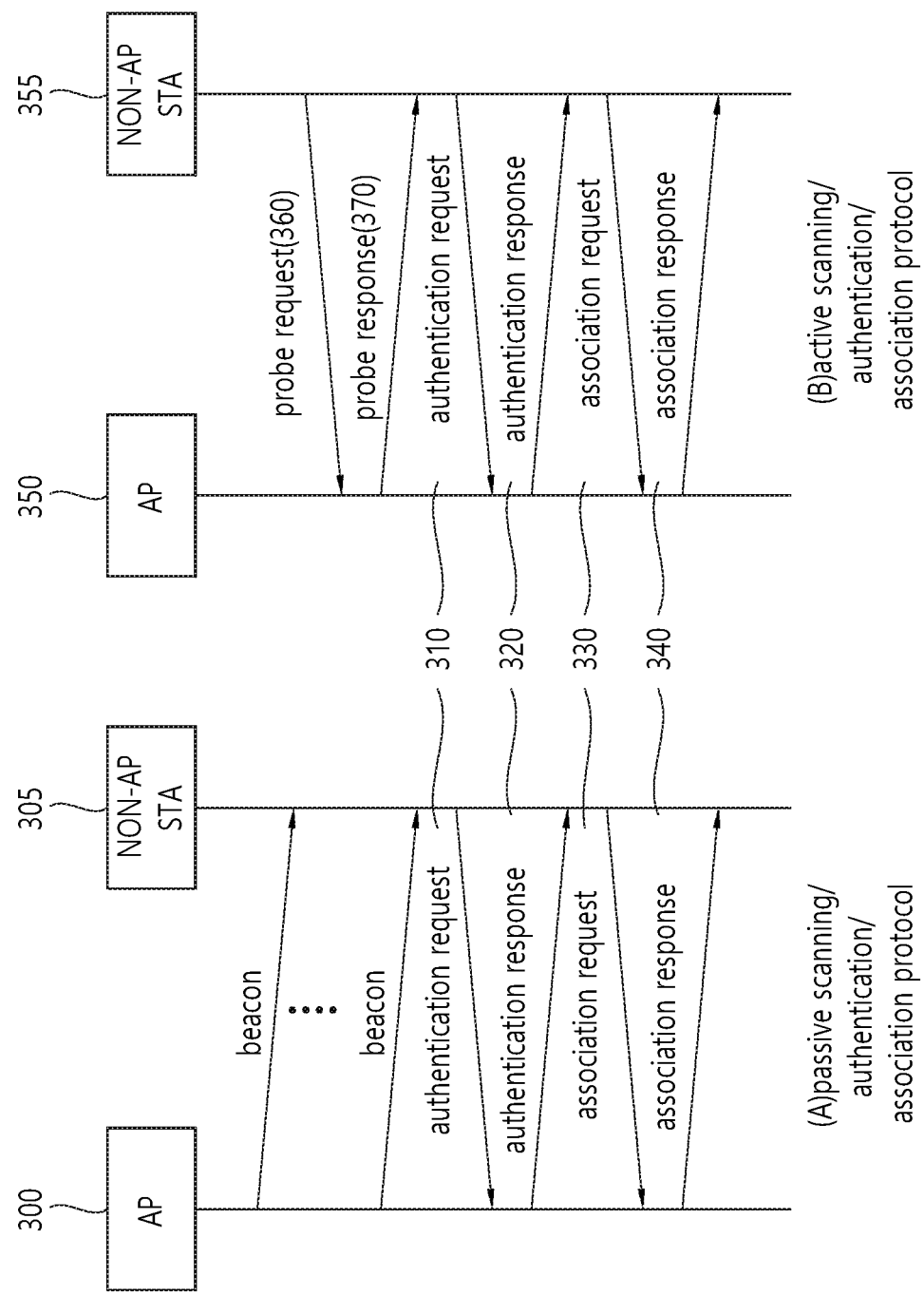
FIG. 3 is a conceptual view illustrating an authentication and association procedure after scanning of an access point (AP) and a station (STA).

FIG. 3 is a conceptual view illustrating an authentication and association procedure after scanning of an AP and an STA.

Referring to FIG. 3, a non-AP STA may perform the authentication and association procedure with respect to one AP among a plurality of APs which have completed a scanning procedure through passive/active scanning. For example, the authentication and association procedure may be performed through 2-way handshaking.

FIG. 3(A) is a conceptual view illustrating an authentication and association procedure after passive scanning, and FIG. 3(B) is a conceptual view illustrating an authentication and association procedure after active scanning.

The authentication and association procedure may be performed regardless of whether the active scanning or the passive scanning is used. For example, APs 300 and 350 exchange an authentication request frame 310, an authentication response frame 320, an association request frame 330, and an association response frame 340 with the non-AP STAs 305 and 355 to perform the authentication and association procedure.

More specifically, the authentication procedure may be performed by transmitting the authentication request frame 310 from the non-AP STAs 305 and 355 to the APs 300 and 350. The APs 300 and 350 may transmit the authentication response frame 320 to the non-AP STAs 305 and 355 in response to the authentication request frame 310. An authentication frame format is disclosed in IEEE 802.11 8.3.3.11.

More specifically, the association procedure may be performed when the non-AP STAs 305 and 355 transmit the association request frame 330 to the APs 300 and 305. The APs 300 and 350 may transmit the association response frame 340 to the non-AP STAs 305 and 355 in response to the association request frame 330.

The association request frame 330 may include information on capability of the non-AP STAs 305 and 355. The APs 300 and 350 may determine whether the non-AP STAs 305 and 355 can be supported based on the information on capability of the non-AP STAs 305 and 355 and included in the association request frame 330.

For example, if the support is available, the AP 300 and 350 may transmit to the non-AP STAs 305 and 355 by allowing the association response frame 340 to contain whether the association request frame 330 is acceptable, its reason, and its supportable capability information. An association frame format is disclosed in IEEE 802.11 8.3.3.5/ 8.3.3.6.

When up to the association procedure mentioned in FIG. 3 is performed, normal data transmission and reception procedures may be performed between the AP and the STA.

Figure 4:
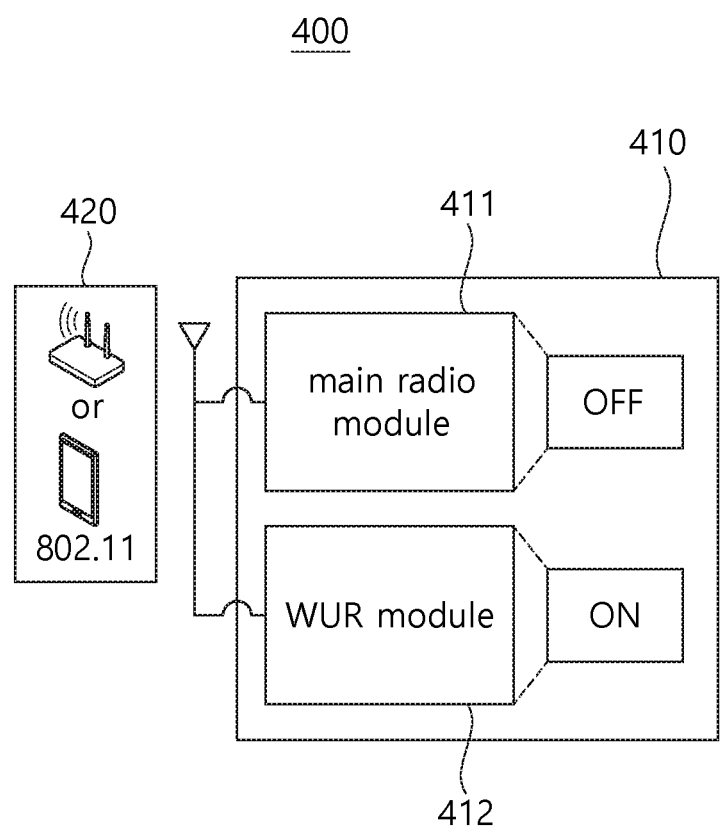
FIG. 4 is an internal block diagram of a wireless terminal receiving a wake-up packet.

FIG. 4 is an internal block diagram of a wireless terminal receiving a wake-up packet.

Referring to FIG. 4, a WLAN system 400 according to the present embodiment may include a first wireless terminal 410 and a second wireless terminal 420.

The first wireless terminal 410 may include a main radio module 411 related to main radio (e.g., 802.11 radio) and a WUR module 412 including low-power wake-up radio (LP WUR). In the present specification, the main radio module may be referred to as a primary component radio (hereinafter, PCR) module.

For example, the main radio module 411 may include a plurality of circuits supporting Wi-Fi, Bluetooth® radio (hereinafter, BT radio), and Bluetooth® Low Energy radio (hereinafter, BLE radio).

In the present specification, the first wireless terminal 410 may control the main radio module 411 in an awake state or a doze state.

For example, when the main radio module 411 is in the awake state, the first wireless terminal 410 is able to transmit an 802.11-based frame (e.g., 802.11-type PPDU) or receive an 802.11-based frame based on the main radio module 411. For example, the 802.11-based frame may be a non-HT PPDU of a 20 MHz band.

For another example, when the main radio module 411 is in the doze state, the first wireless terminal 410 is not able to transmit the 802.11-based frame (e.g., 802.11-type PPDU) or receive the 802.11-based frame based on the main radio module 411.

That is, when the main radio module 411 is in the doze state (e.g., OFF state), the first wireless terminal 400 is not able to receive a frame (e.g., 802.11-type PPDU) transmitted by the second wireless terminal 420 (e.g., AP) until the WUR module 412 wakes up the main radio module 411 to transition to the awake state according to a wake-up packet (hereinafter, WUP). In the present specification, the WUR PPDU and the WUR frame may be understood as the same concept.

In the present specification, when a WUR MAC frame used to wake up the WUR module 412 to transition from a turn-off state to a turn-on state, the WUR PPDU may be mentioned as a wake-up packet (hereinafter, WUP).

In the present specification, a WUR frame having a WUR wake-up type for waking up the WUR module 412 to transition from the turn-off state to the turn-on state may be mentioned as an wake-up packet (WUP).

In the present specification, the first wireless terminal 410 may control the WUR module 412 in the turn-off state or the turn-on state.

For example, the first wireless terminal 410 including the WUR module 412 in the turn-on state is able to receive (or demodulate) only a specific-type frame (i.e., WUR PPDU) transmitted by the second wireless terminal 420 (e.g., AP).

In this case, the specific-type frame (e.g., WUR PPDU) may be a frame (e.g., wake-up packet) modulated by an on-off keying (OOK) modulation scheme described below with reference to FIG. 5.

For example, the first wireless terminal 410 including the WUR module 412 in the turn-off state is not able to receive (or demodulate) a specific-type frame (e.g., WUR PPDU) transmitted by the second wireless terminal 420 (e.g., AP).

In the present specification, the first wireless terminal 410 may separately operate the main radio module (e.g., PCR module) 411 and the WUR module 412.

For example, when the main radio module 411 is in a power save mode (hereinafter, PS mode), the first wireless terminal 410 may control the main radio module 411 to alternate the doze state and the awake state according to a communication environment.

For example, when the WUR module 412 is in a WUR mode, the first wireless terminal 410 may control the WUR module 412 to alternate the turn-on state and the turn-off state according to a state of the main radio module 411 and a pre-agreed duty cycle schedule for the WUR module.

Herein, the wake-up packet modulated according to the OOK scheme may be received based on the WUR module 412 in the turn-on state. In other words, the wake-up packet cannot be received based on the WUR module 412 in the turn-off state.

Specifically, when the main radio module 411 is in the doze state, the first wireless terminal 410 in the WUR mode shall control the WUR module 412 to be in the turn-on state for the WUR module 412 during an agreed duty cycle schedule between the first wireless terminal 410 and the second wireless terminal 420.

In addition, when the main radio module 411 is in the awake state, the first wireless terminal 410 in the WUR mode may control the WUR module 412 to be in the turn-off state. That is, the wireless terminal in the WUR mode may be understood as a wireless terminal having a negotiation status between an AP and a WUR STA so that the WUR module alternates the turn-on state and the turn-off state.

For example, the first wireless terminal 410 in the WUR mode may receive a wake-up packet (WUP) based on the WUR-module 412 in the turn-on state. In addition, when the WUP is received in the WUR module 412, the first wireless terminal 410 in the WUR mode may control the WUR module 412 to wake up the main radio module 411.

In the present specification, in order to represent an ON state of a specific module included in the wireless terminal, the term regarding the awake state and the turn-on state may be used interchangeably. In the same context, in order to represent an OFF state of the specific module included in the wireless terminal, the term regarding the doze state and the turn-off state may be used interchangeably.

The first wireless terminal 410 according to the present embodiment may receive a legacy frame (e.g., 802.11-based PPDU) from the different wireless terminal 420 (e.g., AP) based on the main radio module 411 or WUR module 412 in the awake state.

The WUR module 412 in the doze state may be a receiver for transitioning the main radio module 411 to the awake state. That is, the WUR module 412 may not include a transmitter.

The first wireless terminal 410 may operate the WUR module 412 in the turn-on state while the main radio module 411 is in the doze state.

For example, when the wake-up packet is received based on the WUR module 412 in the turn-on state, the first wireless terminal 410 may control the main radio module 411 in the doze state to transition to the awake state.

For reference, the LP WUR included in the WUR module 412 aims to consume target power less than 1 mW in the active state. In addition, the LP WUR may use a narrow bandwidth less than 5 MHz.

In addition, power consumed by the LP WUR may be less than 1 mW. In addition, a target transmission range of the LP WUR may be implemented to be the same as the conventional 802.11 target transmission range.

The second wireless terminal 420 according to the present embodiment may transmit user data based on main radio (i.e., 802.11). The second wireless terminal 420 may transmit a wake-up packet (WUP) for the WUR module 412.

In the present specification, when the wireless terminal includes the main radio module and the WUR module, it may be understood that the wireless terminal can be mentioned as the WUR state.

Figure 5:
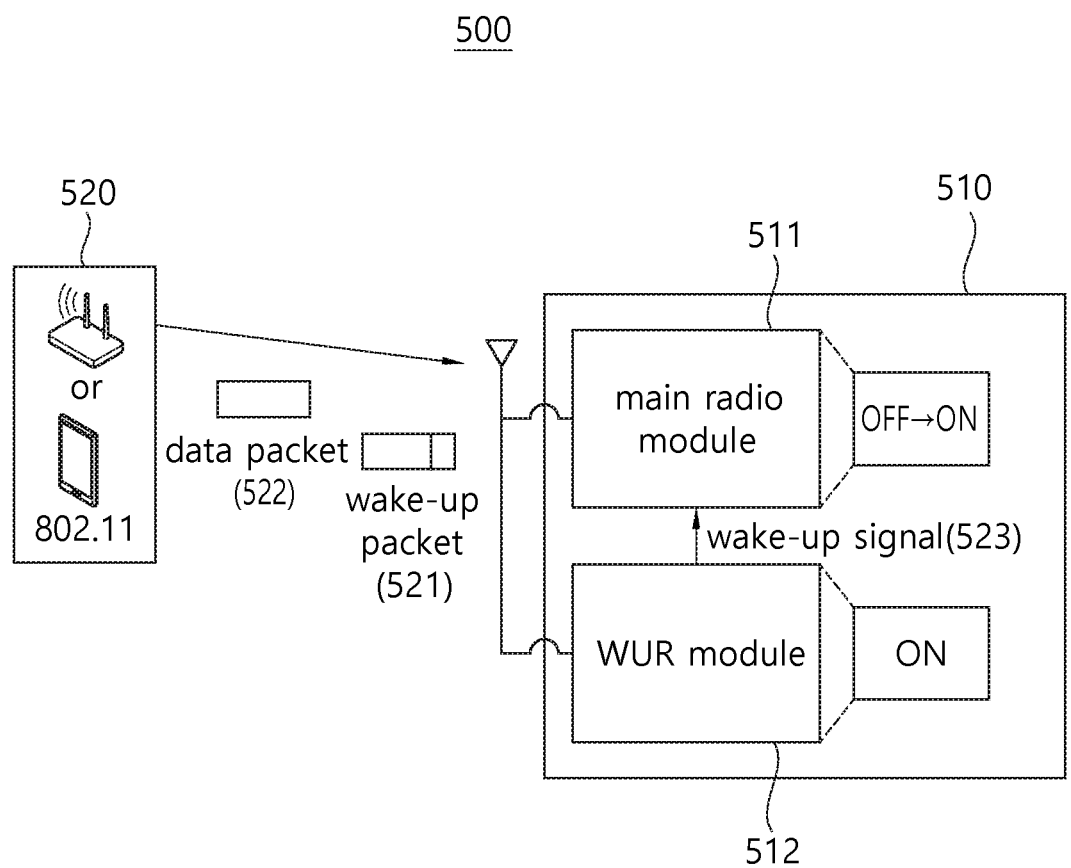
FIG. 5 is a conceptual diagram illustrating a method in which a wireless terminal receives a wake-up packet and a data packet.

FIG. 5 is a conceptual diagram illustrating a method in which a wireless terminal receives a wake-up packet and a data packet.

Referring to FIG. 4 and FIG. 5, a WLAN system 500 according to the present embodiment may include a first wireless terminal 510 corresponding to a receiving terminal and a second wireless terminal 520 corresponding to a transmitting terminal.

A basic operation of the first wireless terminal 510 of FIG. 5 may be understood through a description of the first wireless terminal 410 of FIG. 4. Similarly, a basic operation of the second wireless terminal 520 of FIG. 5 may be understood through a description of the second wireless terminal 420 of FIG. 4.

Referring to FIG. 5, the wake-up packet 521 may be received in a WUR module 512 in a turn-on state (e.g., ON state).

In this case, the WUR module 512 may transfer a wake-up signal 523 to a main radio module 511 in a doze state (e.g., OFF state) in order to accurately receive a data packet 522 to be received after the wake-up packet 521.

For example, the wake-up signal 523 may be implemented based on an internal primitive of the first wireless terminal 510.

For example, when the wake-up signal 523 is received in the main radio module 511 in the doze state (e.g., OFF state), the first wireless terminal 510 may control the main radio module 511 to transition to the awake state (i.e., ON state).

For example, when the main radio module 511 transitions from the doze state (e.g., OFF state) to the awake state (i.e., ON state), the first wireless terminal 510 may activate all or some of a plurality of circuits (not shown) supporting Wi-Fi, BT radio, and BLE radio included in the main radio module 511.

For another example, actual data included the wake-up packet 521 may be directly transferred to a memory block (not shown) of a receiving terminal even if the main radio module 511 is in the doze state (e.g., OFF state).

For another example, when an IEEE 802.11 MAC frame is included in the wake-up packet 521, the receiving terminal may activate only a MAC processor of the main radio module 511. That is, the receiving terminal may maintain a PHY module of the main radio module 511 to be in an inactive state. The wake-up packet 521 of FIG. 5 will be described below in greater detail with reference to the accompanying drawings.

The second wireless terminal 520 may be configured to transmit the wake-up packet 521 to the first wireless terminal 510.

Referring to FIG. 5, in order to indicate that one or more individually addressed frames are available for the first wireless terminal 510 via the main radio module 511 (i.e., to report presence of individually addressed frame(s) buffered for the first wireless terminal by the second wireless terminal), the second wireless terminal 520 may transmit the wake-up packet 521 to the first wireless terminal 510 associated with the second wireless terminal 520. For example, the wake-up packet 521 may include information (e.g., WUR ID) for identifying the first wireless terminal 510.

For another example, the wake-up packet 521 may include information (e.g., group ID) for identifying a group of a plurality of wireless terminals including the first wireless terminal 510.

For another example, the wake-up packet 521 may include a plurality of pieces of identification information in a frame body field. Here, one of the plurality of pieces of identification information may be included to identify the first wireless terminal 510.

Figure 6:
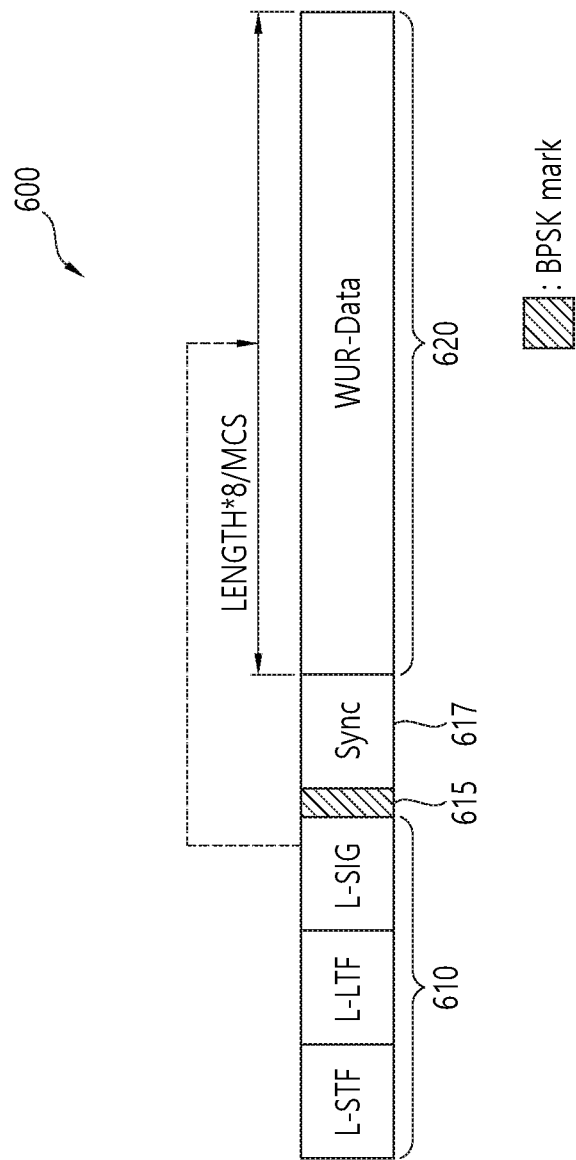
FIG. 6 illustrates an example of a format of a wake-up packet.

FIG. 6 illustrates an example of a WUR PPDU format.

Referring to FIG. 1 to FIG. 6, a wake-up radio (WUR) PPDU 600 may include a legacy preamble 610 defined in the existing IEEE 802.11 standard. In the present specification, the legacy preamble 610 may be understood as a 20 MHz non-HT preamble.

In addition, a WUR PPDU 600 may include a BPSK-mark symbol field 615, a synchronization (hereinafter, 'sync')

field 617, and a WUR-data field 620 for carrying a payload, after the legacy preamble 610.

The WUR-data field 620 may be modulated by a simple modulation scheme (e.g., on-off keying (OOK) modulation scheme). That is, the WUR-data field 620 may include a payload for a receiving terminal.

The legacy preamble 610 may be provided for coexistence with a legacy STA. An L-SIG field for protecting a packet may be used in the legacy preamble 610 for the coexistence.

For example, an 802.11 STA may detect a start portion of a packet through the L-STF field in the legacy preamble 610. The STA may detect an end portion of the 802.11 packet through the L-SIG field in the legacy preamble 610.

The legacy preamble 610 may be understood as a field for a third party legacy STA (STA not including LP-WUR). In other words, the legacy preamble 610 may not be decoded by the LP-WUR.

In order to decrease a false alarm of an 802.11n terminal, the modulated BPSK-mark symbol field 615 may be added after the L-SIG of FIG. 6.

For example, the BPSK-mark symbol field 615 may include one symbol having a length of 4 μs, modulated according to a binary phase shift keying (BPSK) scheme. The BPSK-mark symbol field 615 may have a 20 MHz bandwidth such as a legacy part.

Subsequent to the legacy preamble 610 and the 20 MHz BPSK-mark symbol 615, the WUR PPDU 600 may include a narrow band portion corresponding to the sync field 617 and WUR-data field 620.

The sync field 617 may be configured based on a plurality of sequences predefined to identify two data rates defined for the WUR-data field 620.

The sync field 617 may be modulated according to an OOK scheme. A duration of the sync field 617 may be determined based on a data rate of the WUR-data field 620.

For example, when the data rate applied to the WUR-data field 620 is a high data rate (HDR, 250 kbps), the duration of the sync field 617 may be 64 μs. When the data rate applied to the WUR-data field 620 is a low data rate (LDR, 62.5 kbps), the duration of the sync field 617 may be 128 μs.

That is, the WUR STA may know whether the data rate applied to the WUR-data field 620 is a first data rate (62.5 kbps) for LDR or a second data rate (250 kbps) for HDR based on a result based on detection of the sync field 617.

The WUR-data field 620 may be modulated according to the OOK scheme. The WUR-data field 620 may be configured based on the first data rate (62.5 kbps) for LDR or the second data rate (250 kbps) for HDR.

The WUR-data field 620 may be coded based on a Manchester code as shown in Table 1 and Table 2 below.

For example, when the HDR is applied to the WUR-data field 620, an ON/OFF symbol based on the OOK scheme of the WUR-data field 620 may be configured to have a length of 2μ. In this case, a mapping relation between the ON/OFF symbol included in the WUR-data field 620 and an information bit to be obtained finally by the receiving terminal may be as shown in Table 1 below.

TABLE 1

| Information bit | coded bit |
| --- | --- |
| 0 | 2μ ON + 2μ OFF |
| 1 | 2μ OFF + 2μ ON |

Referring to Table 1, the ON symbol having a length of 2μ and the OFF symbol having a length of 2μ, included in the WUR-data field 620, may be interpreted as an information bit '0'. In addition, the OFF symbol having a length of 2μ and the ON symbol having a length of 2μ, included in the WUR-data field 620, may be interpreted as an information bit '1'.

For example, when LDR is applied to the WUR-data field 620, the ON/OFF symbol based on the OOK scheme of the WUR-data field 620 may be configured to have a length of 4μ. In this case, a mapping relation between the ON/OFF symbol included in the WUR-data field 62- and an information bit to be obtained finally by the receiving terminal may be as shown in Table 2 below.

TABLE 2

| Information bit | coded bit |
| --- | --- |
| 0 | 4μ ON + 4μ OFF + 4μ ON + 4μ OFF |
| 1 | 4μ OFF + 4μ ON + 4μ OFF + 4μ ON |

Referring to Table 2, the ON symbol having a length of 4μ and the OFF symbol having a length of 4μ, included in the WUR-data field 620, may be interpreted as an information bit '0'. In addition, the OFF symbol having a length of 4μ and the ON symbol having a length of 4μ, included in the WUR-data field 620, may be interpreted as an information bit '1'.

Referring to FIG. 1 to FIG. 6, the second wireless terminal (e.g., 520) may be configured to generate and/or transmit the wake-up packets 521 and 600. The first wireless terminal (e.g., 510) may be configured to process the received wake-up packet 521.

Figure 7:
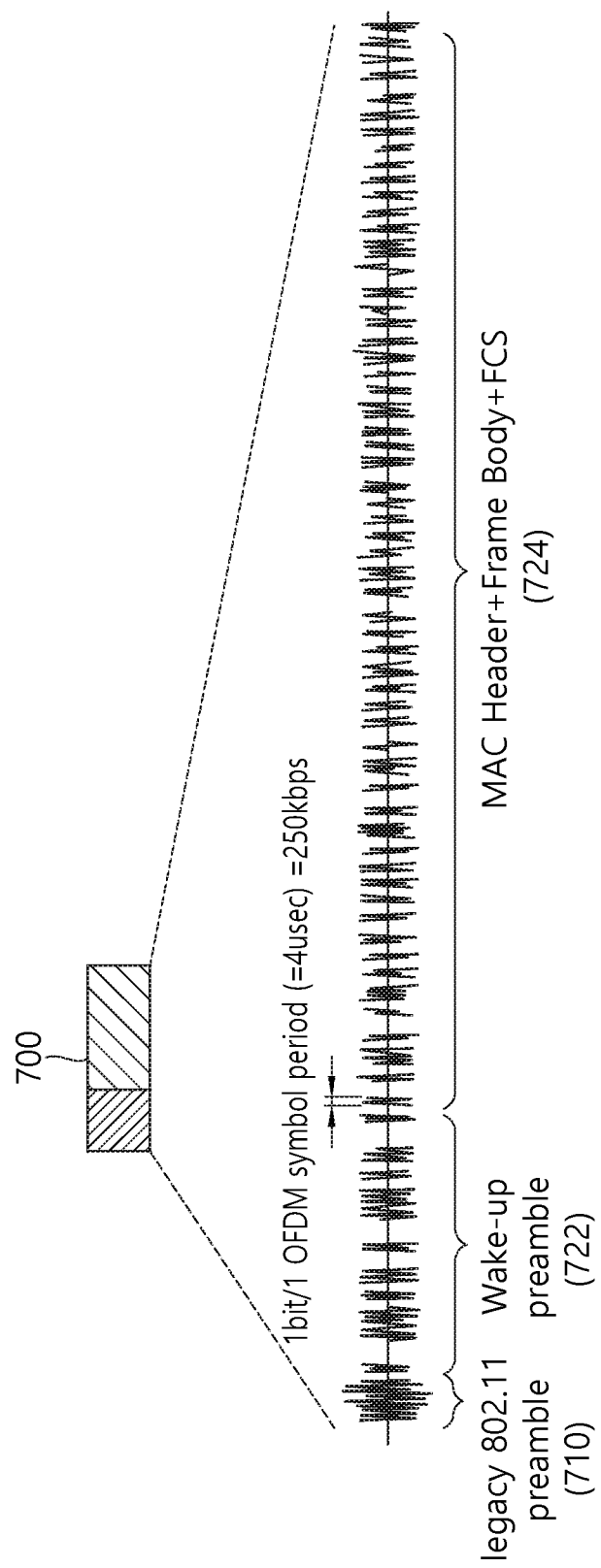
FIG. 7 illustrates a signal waveform of a wake-up packet.

FIG. 7 illustrates a signal waveform of a wake-up packet.

Referring to FIG. 7, a wake-up packet 700 may include a legacy preamble (802.11 preamble) 710 and payloads 722 and 724 modulated based on an on-off keying (OOK) scheme. That is, the wake-up packet WUP according to the present embodiment may be understood in a form in which a legacy preamble and a new LP-WUR signal waveform coexist.

An OOK scheme may not be applied to the legacy preamble 710 of FIG. 7. As described above, the payloads 722 and 724 may be modulated according to the OOK scheme. However, the wake-up preamble 722 included in the payloads 722 and 724 may be modulated according to another modulation scheme.

For example, it may be assumed that the legacy preamble 710 is transmitted based on a channel band of 20 MHz to which 64 FFTs are applied. In this case, the payloads 722 and 724 may be transmitted based on a channel band of about 4.06 MHz.

Figure 8:
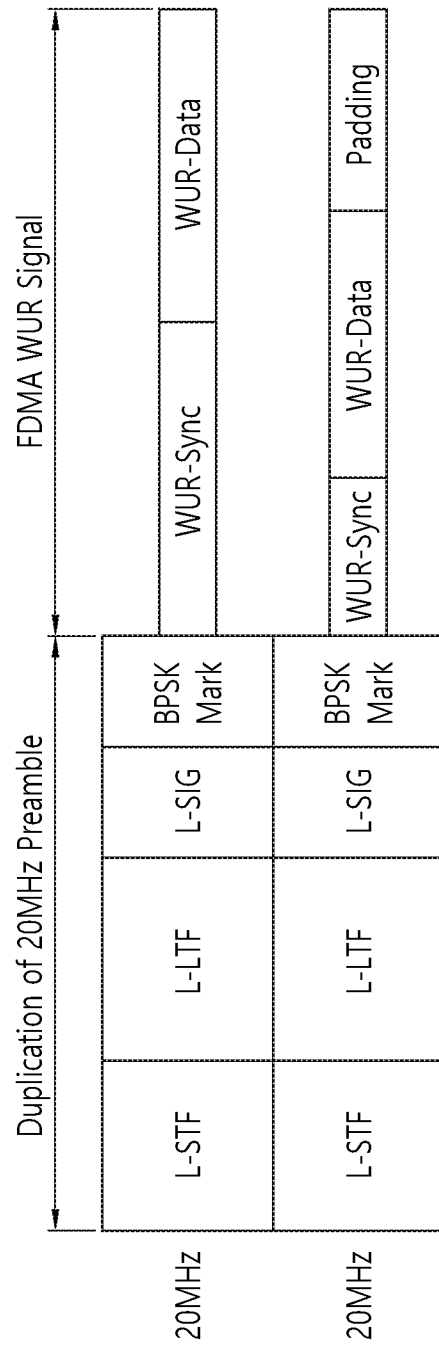
FIG. 8 illustrates a wake-up radio (WUR) PPDU based on frequency division multiplexing access (FDMA) having a 40 MHz channel bandwidth.

FIG. 8 illustrates a WUR PPDU based on frequency division multiplexing access (FDMA) having a 40 MHz channel bandwidth.

Referring to FIG. 8, a 40 MHz preamble may be obtained by duplicating a 20 MHz preamble including L-STF, L-LTF, L-SIG, and BPSK-mark fields.

For an FDMA-based WUR PPDU having a 40 MHz channel bandwidth, a different sync field may be applied to each 20 MHz channel according to a data rate of a WUR-data field.

Referring to FIG. 8, in each 20 MHz sub-channel having the duplicated 20 MHz preamble, one 4 MHz WUR signal located at a center of the 20 MHz sub-channel may be transmitted subsequent to the 20 MHz preamble.

In FDMA transmission, WUR PPDU transmission on each 20 MHz sub-channel may be configured to have the same transmission duration by using a padding field.

Although the FDMA-based WUR PPDU having the 40 MHz channel bandwidth is illustrated for example in FIG. 8, it will be understood that the present specification is not limited thereto. That is, the FDMA-based WUR PPDU may be configured to have an 80 MHz channel bandwidth.

Figure 9:
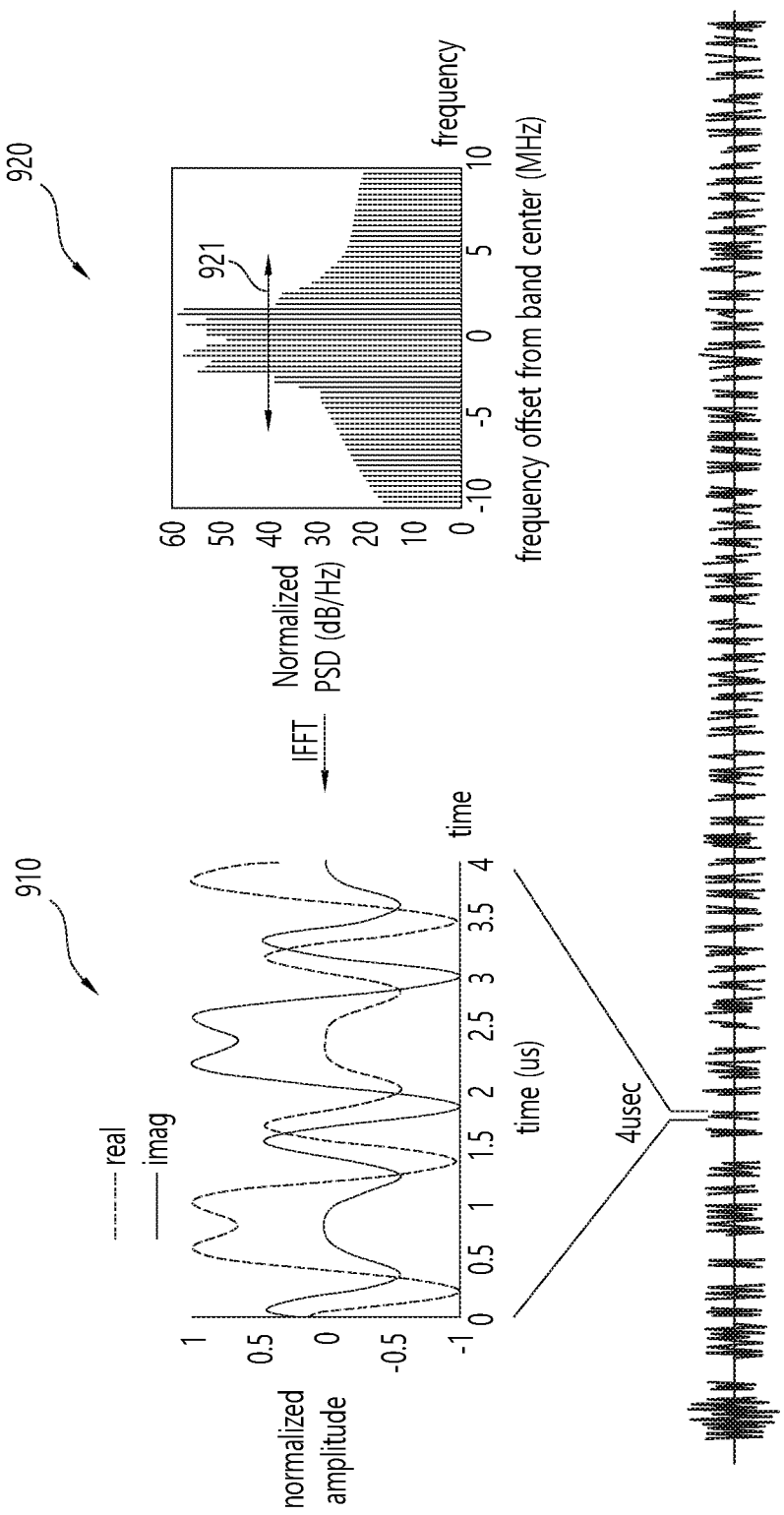
FIG. 9 is a diagram illustrating a design process of a pulse according to an OOK scheme.

FIG. 9 is a diagram illustrating a design process of a pulse according to an OOK scheme. A wireless terminal according to the present embodiment may use an existing orthogonal frequency-division multiplexing (OFDM) transmitter of 802.11 in order to generate pulses according to an OOK scheme. The existing 802.11 OFDM transmitter may generate a 64-bit sequence by applying 64-point IFFT.

Referring to FIG. 1 to FIG. 9, the wireless terminal according to the present embodiment may transmit a payload of a modulated wake-up packet (WUP) according to an OOK scheme. The payload (e.g., 620 of FIG. 6) according to the present embodiment may be implemented based on an ON-signal and an OFF-signal.

The OOK scheme may be applied for the ON-signal included in the payload (e.g., 620 of FIG. 6) of the WUP. In this case, the ON-signal may be a signal having an actual power value. With reference to a frequency domain graph 920, an ON-signal included in the payload (e.g., 620 of FIG. 6) may be obtained by performing IFFT for the N2 number of subcarriers (N2 is a natural number) among the N1 number of subcarriers (N1 is a natural number) corresponding to a channel band of the WUP. Further, a predetermined sequence may be applied to the N2 number of subcarriers.

For example, a channel band of the WUP may be 20 MHz. The N1 number of subcarriers may be 64 subcarriers, and the N2 number of subcarriers may be consecutive 13 subcarriers (921 of FIG. 9). A subcarrier interval applied to the wake-up packet (WUP) may be 312.5 kHz.

The OOK scheme may be applied for an OFF-signal included in the payload (e.g., 620 of FIG. 6) of the WUP. The OFF-signal may be a signal that does not have an actual power value. That is, the OFF-signal may not be considered in a configuration of the WUP.

The ON-signal included in the payload (620 of FIG. 6) of the WUP may be determined (i.e., demodulated) to a 1-bit ON-signal (i.e., '1') by the WUR module (e.g., 512 of FIG. 5). Similarly, the OFF-signal included in the payload may be determined (i.e., demodulated) to a 1-bit OFF-signal (i.e., '0') by the WUR module (e.g., 512 of FIG. 5).

A specific sequence may be preset for a subcarrier set 921 of FIG. 9. In this case, the preset sequence may be a 13-bit sequence. For example, a coefficient corresponding to the DC subcarrier in the 13-bit sequence may be '0', and the remaining coefficients may be set to '1' or '−1'.

With reference to the frequency domain graph 920, the subcarrier set 921 may correspond to a subcarrier whose subcarrier indices are '−6' to '+6'.

For example, a coefficient corresponding to a subcarrier whose subcarrier indices are '−6' to '−1' in the 13-bit sequence may be set to '1' or '−1'. A coefficient corresponding to a subcarrier whose subcarrier indices are '1' to '6' in the 13-bit sequence may be set to '1' or '−1'.

For example, a subcarrier whose subcarrier index is '0' in the 13-bit sequence may be nulled. All coefficients of the remaining subcarriers (subcarrier indexes '−32' to '−7' and subcarrier indexes '+7' to '+31'), except for the subcarrier set 921 may be set to '0'.

The subcarrier set 921 corresponding to consecutive 13 subcarriers may be set to have a channel bandwidth of about 4.06 MHz. That is, power by signals may be concentrated at 4.06 MHz in the 20 MHz band for the wake-up packet (WUP).

According to the present embodiment, when a pulse according to the OOK scheme is used, power is concentrated in a specific band and thus there is an advantage that a signal to noise ratio (SNR) may increase, and in an AC/DC converter of the receiver, there is an advantage that power consumption for conversion may be reduced. Because a sampling frequency band is reduced to 4.06 MHz, power consumption by the wireless terminal may be reduced.

An OFDM transmitter of 802.11 according to the present embodiment may have may perform IFFT (e.g., 64-point IFFT) for the N2 number (e.g., consecutive 13) of subcarriers of the N1 number (e.g., 64) of subcarriers corresponding to a channel band (e.g., 20 MHz band) of a wake-up packet.

In this case, a predetermined sequence may be applied to the N2 number of subcarriers. Accordingly, one ON-signal may be generated in a time domain. One bit information corresponding to one ON-signal may be transferred through one symbol.

For example, when a 64-point IFFT is performed, a symbol having a length of 3.2 us corresponding to a subcarrier set 921 may be generated. Further, when a cyclic prefix (CP, 0.8 us) is added to a symbol having a length of 3.2 us corresponding to the subcarrier set 921, one symbol having a total length of 4 us may be generated, as in the time domain graph 910 of FIG. 9.

Further, the OFDM transmitter of 802.11 may not transmit an OFF-signal.

According to the present embodiment, a first wireless terminal (e.g., 510 of FIG. 5) including a WUR module (e.g., 512 of FIG. 5) may demodulate a receiving packet based on an envelope detector that extracts an envelope of a received signal.

For example, the WUR module (e.g., 512 of FIG. 5) according to the present embodiment may compare a power level of a received signal obtained through an envelope of the received signal with a predetermined threshold level.

If a power level of the received signal is higher than a threshold level, the WUR module (e.g., 512 of FIG. 5) may determine the received signal to a 1-bit ON-signal (i.e., '1'). If a power level of the received signal is lower than a threshold level, the WUR module (e.g., 512 of FIG. 5) may determine the received signal to a 1-bit OFF-signal (i.e., '0'). Generalizing contents of FIG. 9, each signal having a length of K (e.g., K is a natural number) in the 20 MHz band may be transmitted based on consecutive K subcarriers of 64 subcarriers for the 20 MHz band. For example, K may correspond to the number of subcarriers used for transmitting a signal. Further, K may correspond to a bandwidth of a pulse according to the OOK scheme.

All coefficients of the remaining subcarriers, except for K subcarriers among 64 subcarriers may be set to '0'.

Specifically, for a one bit OFF-signal corresponding to '0' (hereinafter, information 0) and a one bit ON-signal corresponding to '1' (hereinafter, information 1), the same K subcarriers may be used. For example, the used index for the K subcarriers may be expressed as 33−floor (K/2): 33+ceil (K/2)−1.

In this case, the information 1 and the information 0 may have the following values.

Information 0=zeros (1, K)
Information 1=alpha*ones (1, K)

The alpha is a power normalization factor and may be, for example, 1/sqrt (K).

Figure 10:
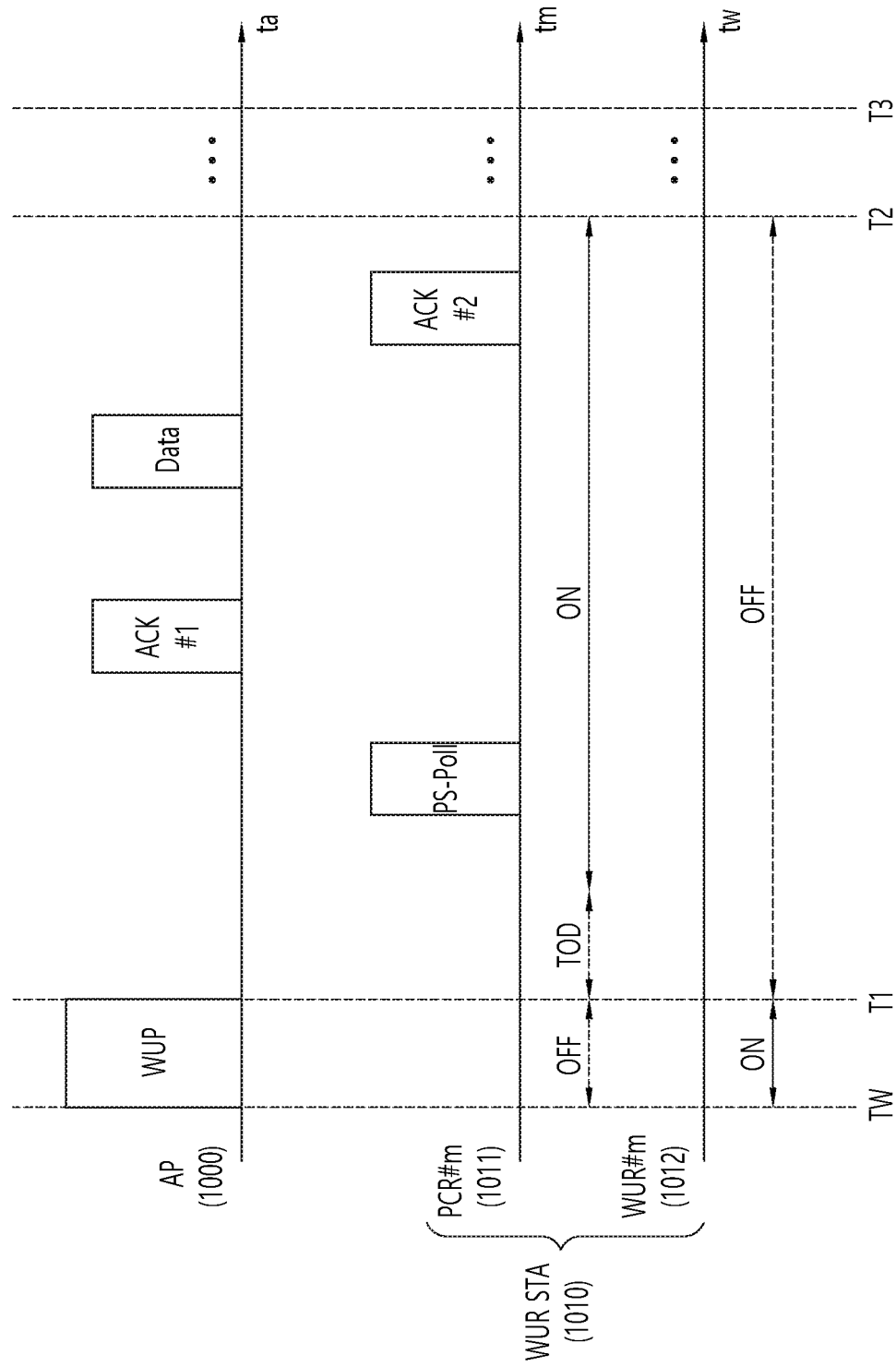
FIG. 10 illustrates a basic operation for a WUR STA.

FIG. 10 illustrates a basic operation for a WUR STA.

Referring to FIG. 10, an AP 1000 may correspond to the second wireless terminal 520 of FIG. 5. A horizontal axis of the AP 1000 of FIG. 10 may indicate a time ta. A vertical axis of the AP 1000 of FIG. 10 may be related to presence of a packet (or frame) to be transmitted by the AP 1000.

A WUR STA 1010 may correspond to the first wireless terminal 510 of FIG. 5. The WUR STA 1010 may include a main radio module (or PCR #m) 1011 and a WUR module (or WUR #m) 1012. The main radio module 1011 of FIG. 10 may correspond to the main radio module 511 of FIG. 5.

Specifically, the main radio module 1011 may support both a reception operation for receiving an 802.11-based packet from the AP 1000 and a transmission operation for transmitting the 802.11-based packet to the AP 1000. For example, the 802.11-based packet may be a packet modulated according to an OFDM scheme.

A horizontal axis of the main radio module 1011 may indicate a time tm. An arrow displayed at the lower end of the horizontal axis of the main radio module 1011 may be related to a power state (e.g., ON state or OFF state) of the main radio module 1011. The vertical axis of the main radio module 1011 may be related to presence of a packet to be transmitted based on the main radio module 1011.

The WUR module 1012 of FIG. 10 may correspond to the WUR module 512 of FIG. 5. Specifically, the WUR module 1012 may support only a reception operation for a packet modulated from the AP 1000 according to an on-off keying (OOK) scheme.

A horizontal axis of the WUR module 1012 may indicate a time tw. Further, an arrow disposed at the lower end of the horizontal axis of the WUR module 1012 may be related to a power state (e.g., ON state or OFF state) of the WUR module 1012.

The WUR STA 1010 of FIG. 10 may be understood as a wireless terminal associated with the AP 1000 by performing an association procedure.

The WUR STA 1010 of FIG. 10 may be understood as a wireless terminal operating based on a PS mode. Accordingly, the WUR STA 1010 may control the main radio module 1010 to be in a doze state or an awake state.

In addition, the WUR STA 1010 may be understood as a wireless terminal operating based on a WUR mode. Accordingly, the WUR STA 1010 may control the WUR module 1012 to be in a turn-off state or a turn-on state.

Referring to FIG. 5 and FIG. 10, the AP 1000 of FIG. 10 may correspond to the second wireless terminal 520 of FIG. 5. A horizontal axis of the AP 1000 of FIG. 10 may represent a time ta. A vertical axis of the AP 1000 of FIG. 10 may be related to presence of a packet (or frame) to be transmitted by the AP 1000.

The WUR STA 1010 may correspond to the first wireless terminal 510 of FIG. 5. The WUR STA 1010 may include a main radio module (or PCR #m) 1011 and a WUR module (or WUR #m) 1012. The main radio module 1011 of FIG. 10 may correspond to the main radio module 511 of FIG. 5.

Specifically, the main radio module 1011 may support both a reception operation for receiving an 802.11-based packet from the AP 1000 and a transmission operation for transmitting an 802.11-based packet to the AP 1000. For example, the 802.11-based packet may be a packet modulated according to the OFDM scheme.

A horizontal axis of the main radio module 1011 may represent a time tm. An arrow displayed at the lower end of the horizontal axis of the main radio module 1011 may be related to a power state (e.g., ON state or OFF state) of the main radio module 1011.

A vertical axis of the main radio module 1011 may be related to presence of a packet to be transmitted based on the main radio module 1011. A WUR module 1012 of FIG. 10 may correspond to the WUR module 512 of FIG. 5. Specifically, the WUR module 1012 may support only a reception operation for a packet modulated from the AP 1000 according to the OOK scheme.

A horizontal axis of the WUR module 1012 may represent a time tw. Further, an arrow displayed at the lower end of the horizontal axis of the WUR module 1012 may be related to a power state (e.g., ON state or OFF state) of the WUR module 1012.

In a wake-up duration TW to T1 of FIG. 10, the WUR STA 1010 may control the main radio module 1010 to be in a doze state (i.e., OFF state). In addition, the WUR STA 1010 may control the WUR module 1012 to be in a turn-on state (i.e., ON state).

When a data packet for the WUR STA 1010 exists in the AP 1000, the AP 1000 may transmit a wake-up packet (WUP) to the WUR STA 1010 in a contention-based manner.

In this case, the WUR STA 1010 may receive the WUP based on the WUR module 1012 in a turn-on state (i.e., ON state). Herein, the WUP may be understood based on the description mentioned above with reference to FIG. 5 to FIG. 7.

In a first duration T1 to T2 of FIG. 10, a wake-up signal (e.g., 523 of FIG. 5) for waking up the main radio module 511 according to the WUP received in the WUR module 1012 may be transferred to the main radio module 511.

In the present specification, a time required when the main radio module 511 transitions from a doze state to an awake state according to the wake-up signal (e.g., 523 of FIG. 5) may be referred to as a turn-on delay (hereinafter, TOD).

Referring to FIG. 10, upon elapse of the TOD, the main radio module 511 may be in the awake state.

For example, upon elapse of the TOD, the WUR STA 1010 may control the main radio module 1010 to be in the awake state (e.g., ON state). For example, upon elapse of a wake-up duration TW to T1, the WUR STA 1010 may control the WUR module 1012 to be in the turn-on state (i.e., OFF state).

Subsequently, the WUR STA 1010 may transmit a power save poll (hereinafter, PS-poll) to the AP 1000 based on the main radio module 1011 in the awake state (i.e., ON state).

Herein, the PS-poll frame may be a frame for reporting that the WUR STA 1010 is able to receive a data packet for the WUR STA 1010 existing in the AP 1000 based on the main radio module 1011. In addition, the PS-poll frame may be a frame transmitted in a contention-based manner with respect to another wireless terminal (not shown).

Subsequently, the AP 1000 may transmit a first ACK frame (ACK #1) to the WUR STA 1010 in response to the PS-poll frame.

Subsequently, the AP 1000 may transmit the data packet for the WUR STA 1010 to the WUR STA 1010. In this case, the data packet (Data) for the WUR STA 1010 may be received based on the main radio module 1011 in the awake state (i.e., ON state).

Subsequently, the WUR STA 1010 may transmit a second ACK frame (ACK #2) to the AP 1000 to report that the data packet (data) for the WUR STA 1010 is successfully received.

Figure 11:
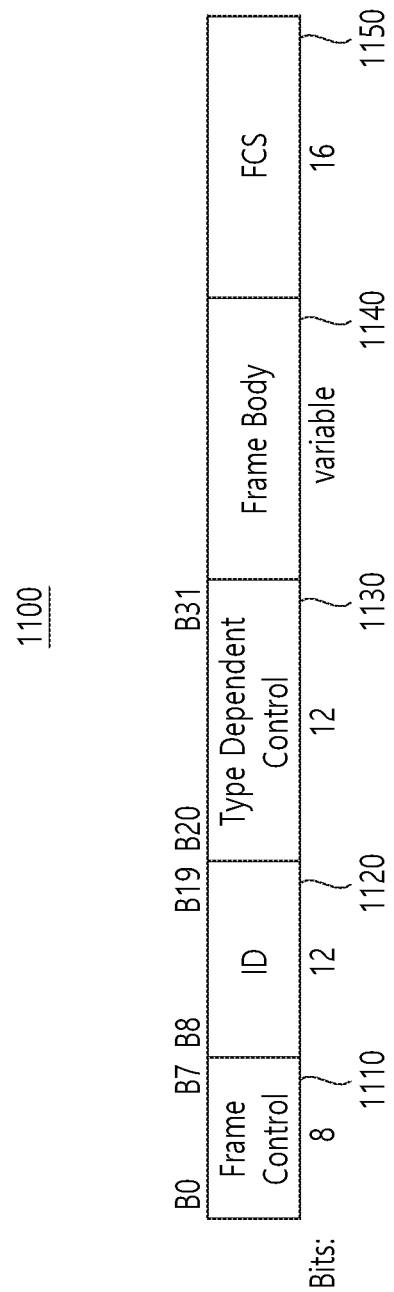
FIG. 11 illustrates a medium access control (MAC) frame structure for a WUR frame according to the present embodiment.

FIG. 11 illustrates a MAC frame structure for a WUR frame according to the present embodiment.

Referring to FIG. 1 to FIG. 11, a WUR-data field (e.g., 620 of FIG. 6) included in the WUR PPDU according to the present embodiment may conform to a MAC frame structure 1100 of FIG. 11.

The MAC frame structure 1100 for the WUR frame of FIG. 11 may include a plurality of fields 1110 to 1150.

A frame control field 1110 is configured based on 8-bit information B0 to B7, and will be described below in greater detail with reference to FIG. 12.

An ID field 1120 may be configured based on 12-bit information B8 to B19. For example, when a wake-up packet is individually addressed, identification information (WUR identifier, hereinafter, WUR ID) for one wireless terminal for receiving a wake-up packet to which a unicast scheme is applied may be set in the ID field 1120.

Specifically, the WUR ID included in the wake-up packet to which the unicast scheme is applied may be used to identify a WUR STA for which an immediate response is intended.

For another example, when the wake-up packet is group-addressed, a group ID (hereinafter, GID) for a plurality of wireless terminals for receiving the wake-up packet to which a multicast scheme is applied may be set in the ID field 1120.

In addition, when the wake-up packet is broadcast addressed, identification information (transmitter ID, hereinafter, TXID) of a wireless terminal for transmitting a wake-up packet to which a broadcast scheme is applied may be set in the ID field 1120.

For another example, the ID field 1120 may be set to '0' in order to signal that a plurality of WUR IDs are included in a frame body field (i.e., 1140 of FIG. 11) of the wake-up packet.

A type dependent control field 1130 may be expressed by 12-bit information B20 to B31. For example, information related to a BSS update may be included in the type dependent control field 1130.

A frame body field 1140 may have a variable length. A WUR ID for each of a plurality of wireless terminals may be included in the frame body field 1140.

For example, the frame body field 1140 may not be included in a WUR frame having a fixed-length. For another example, the frame body field 1140 may be included in a WUR frame having a variable-length.

In the present specification, the WUR frame having the fixed-length may be referred to as a fixed-length (FL) WUR frame. For example, the FL WUR frame may not include the frame body field.

The WUR frame having the variable-length may be referred to as a variable-length (VL) WUR frame. For example, the VL WUR frame may include a frame body field of a variable-length.

A frame check sequence (FCS) field 1150 may include CRC information having a length of 16 bits.

Figure 12:
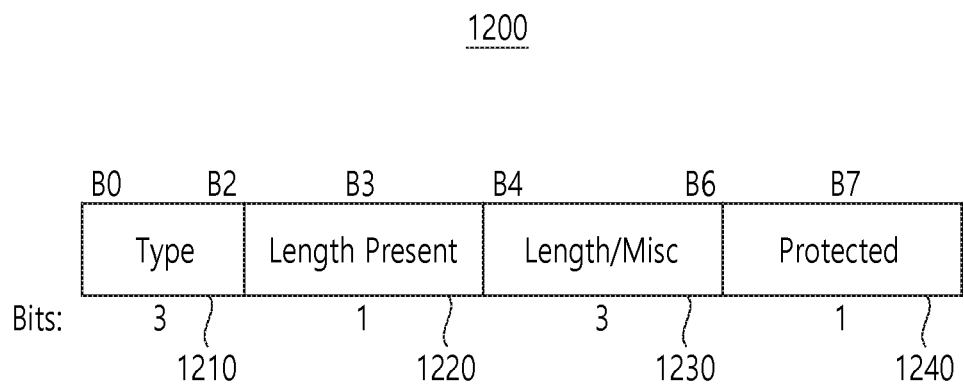
FIG. 12 illustrates a structure of a frame control field of a WUR frame according to the present embodiment.

FIG. 12 illustrates a structure of a frame control field of a WUR frame according to the present embodiment.

Referring to FIG. 12, a frame control field 1200 (e.g., 1110 of FIG. 11) of a WUR frame according to the present embodiment may include a plurality of fields 1210 to 1250.

Information of Table 3 below may be included in a type field 1210, based on a length of 3 bits.

TABLE 3

| Type | Type description |
|---|---|
| 0 | WUR Beacon |
| 1 | WUR Wake-up |

TABLE 3-continued

| Type | Type description |
|---|---|
| 2 | WUR Vendor Specific |
| 3 | WUR discovery |
| 4-7 | Reserved |

For example, referring to Table 3, when a type of the WUR frame is a WUR beacon frame, the WUR beacon frame may be understood as an FL WUR frame not including a frame body field (e.g., 1140 of FIG. 11).

For example, each of a WUR wake-up frame (i.e., wake-up packet) including one WUR ID, a WUR wake-up frame (i.e., wake-up packet) including one GID, and a WUR wake-up frame (i.e., wake-up packet) including TXID may be understood as a non-existent FL WUR frame not including a frame body field (e.g., 1140 of FIG. 11).

However, a WUR wake-up frame (e.g., wake-up packet) including a plurality of WUR IDs may be understood as a VL WUR frame including the frame body field (e.g., 1140 of FIG. 11).

Information on a length of the frame body field (e.g., 1140 of FIG. 11) is included in the VU WUR frame, whereas the information on the length of the frame body field (e.g., 1140 of FIG. 11) is not included in the FL WUR frame.

Conventionally, in the type field 1210, only one value for the WUR wake-up frame (i.e., wake-up packet) is allocated, and information for differentiating the VL WUR frame and the FL WUR frame is not additionally included in the frame control field 1200 of the WUR frame.

Hereinafter, the present specification discloses a method for signaling the information for differentiating the VL WUR frame and the FL WUR frame by using some bits of the frame control field of the WUR frame.

According to the present embodiment, a length present field 1220 may include information regarding whether a length sub-field for the VL WUR frame is included in a length/mist field 1230 subsequent thereto. For example, the length present field 1220 may be configured to have a length of 1 bit.

A length sub-field may be included in the length/mist field 1230 according to the length present field 1220.

For example, when the length present field 1220 is set to a first value for the VL WUR frame, the length/mist field 1230 may include information on a length of a frame body field (e.g., 1140 of FIG. 11).

For another example, when the length present field 1220 is set to a second value for the FL WUR frame, the length/mist field 1230 may be reserved. Alternatively, when the length present field 1220 is set to the second value, different information may be included in the length/mist field 1230.

Information for indicating whether information to be transferred on the wake-up packet is processed by a message integrity check (MIC) algorithm may be included in the protected field 1240.

Positions of a plurality of fields shown in FIG. 12 are for exemplary purposes only, and it will be understood that the present specification is not limited thereto. For example, a position of the length present field 1220 may be changed to a position of the protected field 1240.

Figure 13:
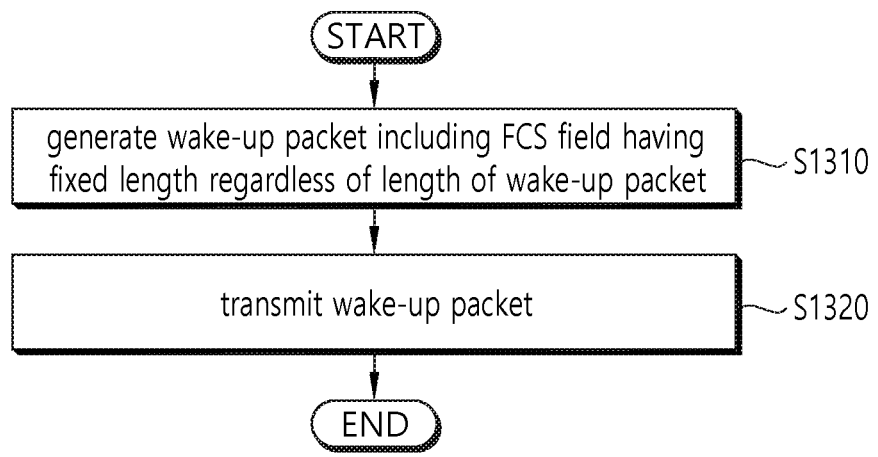
FIG. 13 is a flowchart illustrating a method for communication in a WLAN system from the perspective of an AP according to an embodiment.

FIG. 13 is a flowchart illustrating a method for communication in a WLAN system from the perspective of an AP according to an embodiment.

Referring to FIG. 1 to FIG. 13, a first wireless terminal mentioned in FIG. 13 may be understood as an access point (AP). A second wireless terminal mentioned in FIG. 13 may be understood as a station (STA) connected to the first wireless terminal, which is the AP.

The second wireless terminal (e.g., 510 in FIG. 5) mentioned in FIG. 13 may include a primary connectivity radio (PCR) module (e.g., 511 in FIG. 5) and a wake-up radio (WUR) module (e.g., 512 in FIG. 5) to receive a wake-up packet modulated by an OOK scheme. The second wireless terminal (e.g., 510 in FIG. 5) mentioned in FIG. 13 may control the WUR module thereof to be in a turn-on state in order to receive a wake-up packet to be received from the first wireless terminal.

In operation S1310, the first wireless terminal may generate a wake-up packet modulated by an on-off keying (OOK) scheme.

For example, the wake-up packet may include a plurality of pieces of unicast identification information (i.e., WUR IDs) for a plurality of second wireless terminals. In this case, the wake-up packet may have a variable length according to the number of the plurality of second wireless terminals.

For example, the wake-up packet may include one piece of unicast identification information (i.e., WUR ID) for one second wireless terminal. In this case, the wake-up packet may have a constant length.

For example, the wake-up packet may include broadcast identification information (i.e., TXID) or group identification information (i.e., GID) for a plurality of second wireless terminals. In this case, the wake-up packet may have a constant length.

According to an embodiment, the wake-up packet may include a frame check sequence (FCS) field (e.g., 1150 in FIG. 11) having a fixed length regardless of the length of the wake-up packet.

In operation S1320, the first wireless terminal may transmit the generated wake-up packet to one or more second wireless terminals.

A four-byte FCS field used in a conventional WLAN system may be inefficient in a situation where a low data rate (i.e., LDR) is applied to a wake-up packet. That is, considering that a MAC header of a CL WUR frame is four bytes, the four-byte FCS field may be excessive overhead.

Further, considering that the maximum length of a VL WUR frame is 16 bytes, a one-byte FCS field may not provide sufficient reliability.

As a result, it will be understood that, according to the disclosure, using an FCS field having a length of two bytes makes it possible to provide a method for communication in a WLAN system with improved efficiency.

Figure 14:
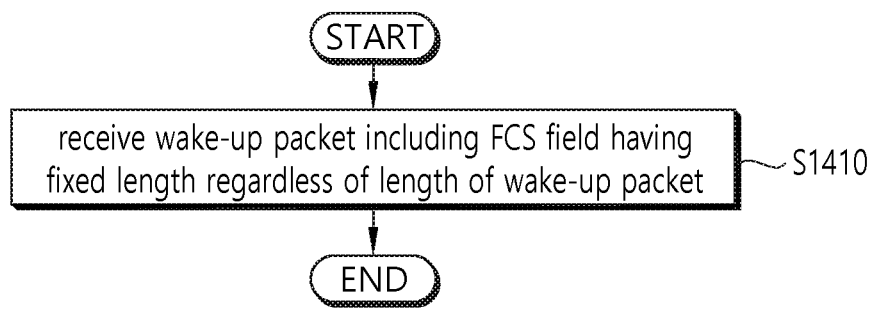
FIG. 14 is a flowchart illustrating a method for communication in a WLAN system from the perspective of a STA according to an embodiment.

FIG. 14 is a flowchart illustrating a method for communication in a WLAN system from the perspective of a STA according to an embodiment.

Referring to FIG. 14, a first wireless terminal mentioned in FIG. 14 may be understood as a station (STA). A second wireless terminal mentioned in FIG. 14 may be understood as an AP connected to the first wireless terminal, which is the STA.

The first wireless terminal (e.g., 510 in FIG. 5) mentioned in FIG. 14 may include a primary connectivity radio (PCR) module (e.g., 511 in FIG. 5) and a wake-up radio (WUR) module (e.g., 512 in FIG. 5) to receive a wake-up packet modulated by an OOK scheme.

The first wireless terminal (e.g., 510 in FIG. 5) mentioned in FIG. 14 may control the WUR module thereof to be in a turn-on state in order to receive a wake-up packet to be received from the first wireless terminal.

In operation S1410, the first wireless terminal may receive a wake-up packet modulated by an on-off keying (OOK) scheme.

For example, the wake-up packet may include a plurality of pieces of unicast identification information (i.e., WUR IDs) for a plurality of second wireless terminals. In this case, the wake-up packet may have a variable length according to the number of the plurality of second wireless terminals.

For example, the wake-up packet may include one piece of unicast identification information (i.e., WUR ID) for one second wireless terminal. In this case, the wake-up packet may have a constant length.

For example, the wake-up packet may include broadcast identification information (i.e., TXID) or group identification information (i.e., GID) for a plurality of second wireless terminals. In this case, the wake-up packet may have a constant length.

According to an embodiment, the wake-up packet may include a frame check sequence (FCS) field (e.g., 1150 in FIG. 11) having a fixed length regardless of the length of the wake-up packet.

Figure 15:
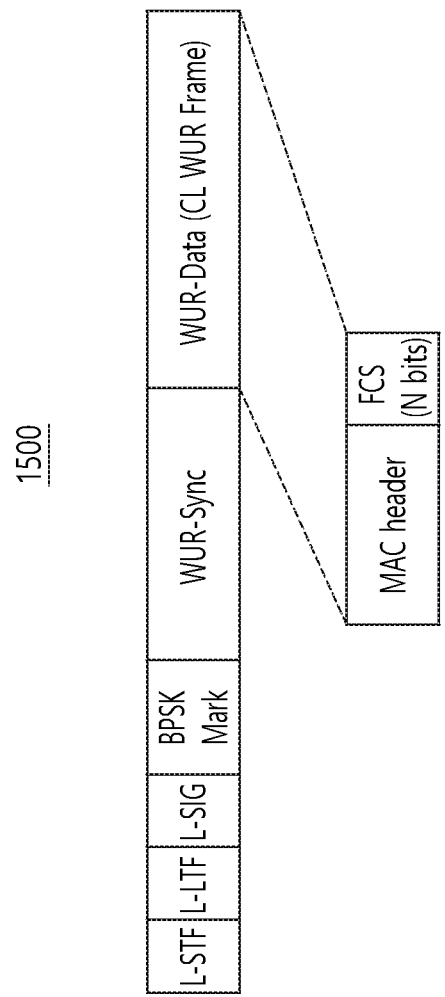
FIG. 15 and FIG. 16 illustrate an FCS field according to the type of a wake-up packet according to an embodiment.
Figure 16:
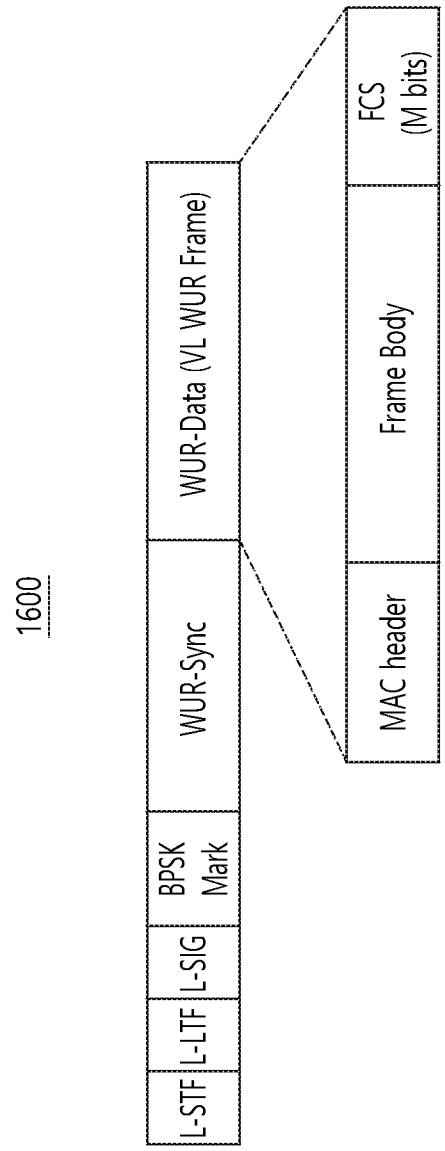

FIG. 15 and FIG. 16 illustrate an FCS field according to the type of a wake-up packet according to an embodiment.

Referring to FIG. 15, a wake-up packet 1500 of FIG. 15 may be understood as a CL WUR frame. For example, an FCS field included in the wake-up packet 1500 of FIG. 15 may be configured with N bits.

Referring to FIG. 16, a wake-up packet 1600 of FIG. 16 may be understood as a VL WUR frame. For example, an FCS field included in the wake-up packet 1600 of FIG. 16 may be configured with M bits (M>N).

Examples of a combination of (M, N) may include (8, 16), (8, 32), and (16, 32). A preferred combination of (M, N) according to an embodiment may be (8, 32).

Figure 17:
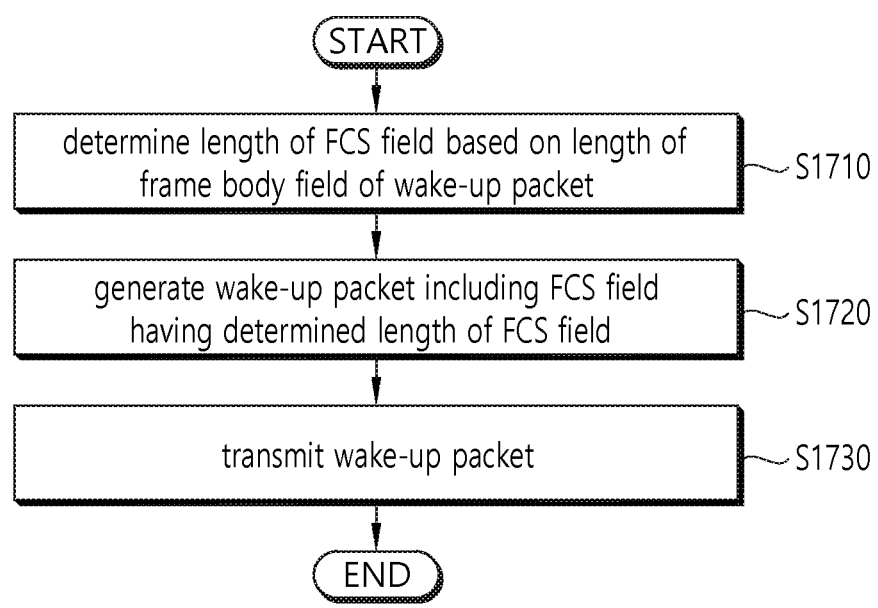
FIG. 17 is a flowchart illustrating a method for communication in a WLAN system from the perspective of an AP according to another embodiment.

FIG. 17 is a flowchart illustrating a method for communication in a WLAN system from the perspective of an AP according to another embodiment.

Referring to FIG. 1 to FIG. 17, a first wireless terminal mentioned in FIG. 17 may be understood as an access point (AP). A second wireless terminal mentioned in FIG. 17 may be understood as a station (STA) connected to the first wireless terminal, which is the AP.

The second wireless terminal (e.g., 510 in FIG. 5) mentioned in FIG. 17 may include a primary connectivity radio (PCR) module (e.g., 511 in FIG. 5) and a wake-up radio (WUR) module (e.g., 512 in FIG. 5) to receive a wake-up packet modulated by an OOK scheme.

The second wireless terminal (e.g., 510 in FIG. 5) mentioned in FIG. 17 may control the WUR module thereof to be in a turn-on state in order to receive a wake-up packet to be received from the first wireless terminal.

In operation S1710, the first wireless terminal may determine the length of an FCS field based on the length of a frame body field (e.g., 1140 in FIG. 11) of a wake-up packet.

For example, in a CL WUR frame, since a frame body field is not included in a wake-up packet, an FCS field of the CL WUR frame may be configured to have a first-type length. For example, the first-type length may be one byte.

For example, when the length of a frame body field (e.g., 1140 in FIG. 11) of a VL WUR frame is set within a range from one byte to eight bytes, an FCS field of the VL WUR frame may be configured to have a second-type length. For example, the second-type length may be two bytes.

For example, when the length of a frame body field (e.g., 1140 in FIG. 11) of a VL WUR frame is set to be greater than eight bytes, an FCS field of the VL WUR frame may be configured to have a third-type length. For example, the third-type length may be four bytes.

In operation S1720, the first wireless terminal may generate a wake-up packet including an FCS field having the determined length. In this case, the wake-up packet may be modulated by an on-off keying (OOK) scheme.

For example, the wake-up packet may include a plurality of pieces of unicast identification information (i.e., WUR IDs) for a plurality of second wireless terminals. In this case, the wake-up packet may have a variable length according to the number of the plurality of second wireless terminals.

For example, the wake-up packet may include one piece of unicast identification information (i.e., WUR ID) for one second wireless terminal. In this case, the wake-up packet may have a constant length.

For example, the wake-up packet may include broadcast identification information (i.e., TXID) or group identification information (i.e., GID) for a plurality of second wireless terminals. In this case, the wake-up packet may have a constant length.

In operation S1720, the first wireless terminal may transmit the generated wake-up packet to one or more second wireless terminals.

Figure 18:
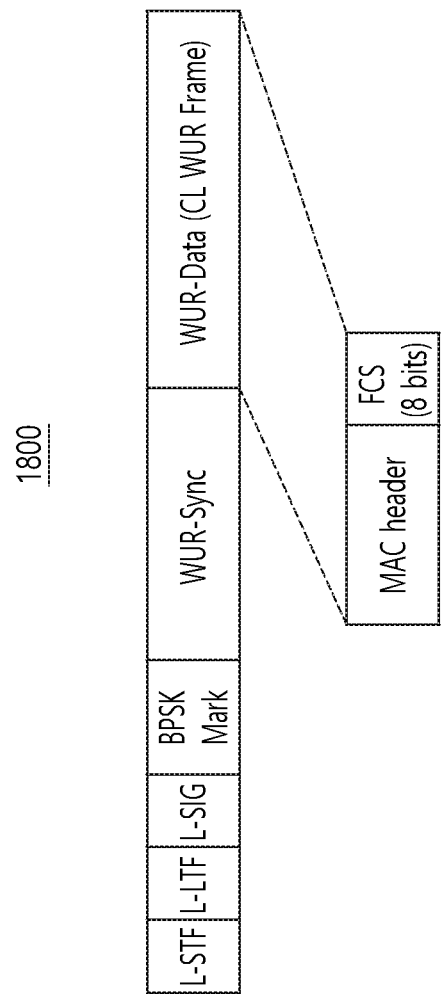
FIG. 18 to FIG. 20 illustrate the type of an FCS field of a wake-up packet according to an embodiment.
Figure 19:
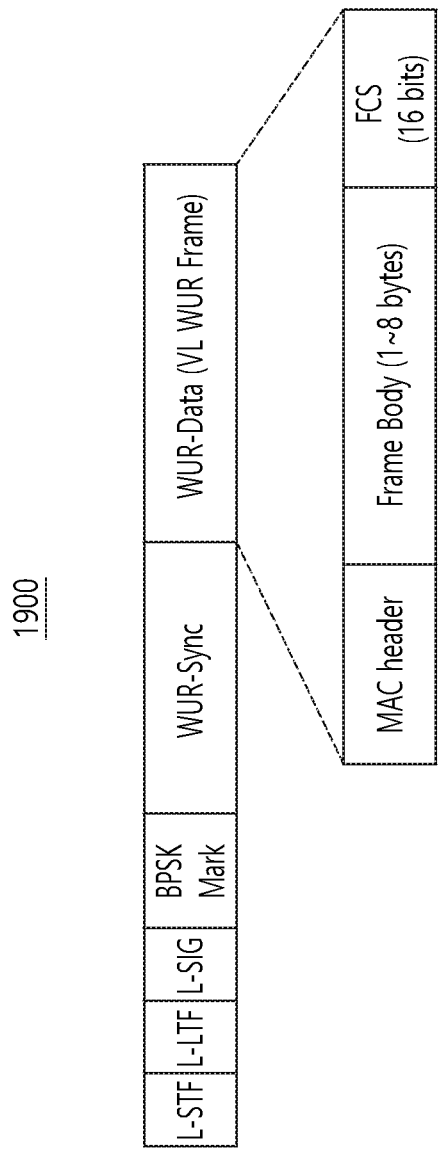
Figure 20:
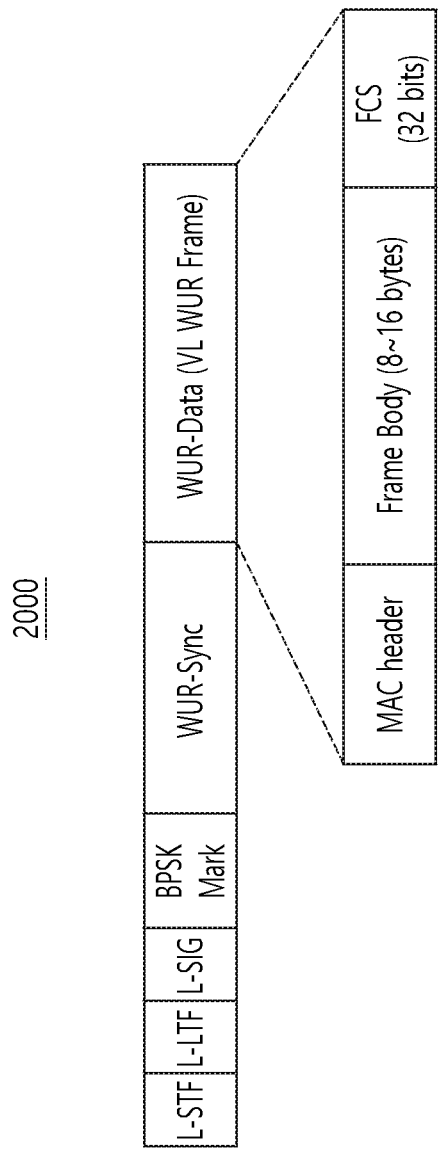

FIG. 18 to FIG. 20 illustrate the type of an FCS field of a wake-up packet according to an embodiment.

Referring to FIG. 17 and FIG. 18, a wake-up packet 1800 of FIG. 18 may be understood as a CL WUR frame. For example, an FCS field included in the wake-up packet 1800 of FIG. 18 may be configured with eight bits (i.e., 1 byte) corresponding to the first-type length.

Referring to FIG. 19, a wake-up packet 1900 of FIG. 19 may be understood as a VL WUR frame having a frame body field of one to eight bytes. For example, an FCS field included in the wake-up packet 1900 of FIG. 19 may be configured with 16 bits (i.e., 2 bytes) corresponding to the second-type length.

Referring to FIG. 20, a wake-up packet 2000 of FIG. 20 may be understood as a VL WUR frame having a frame body field of 9 to 16 bytes. For example, an FCS field included in the wake-up packet 2000 of FIG. 20 may be configured with 32 bits (i.e., 4 bytes) corresponding to the third-type length.

Figure 21:
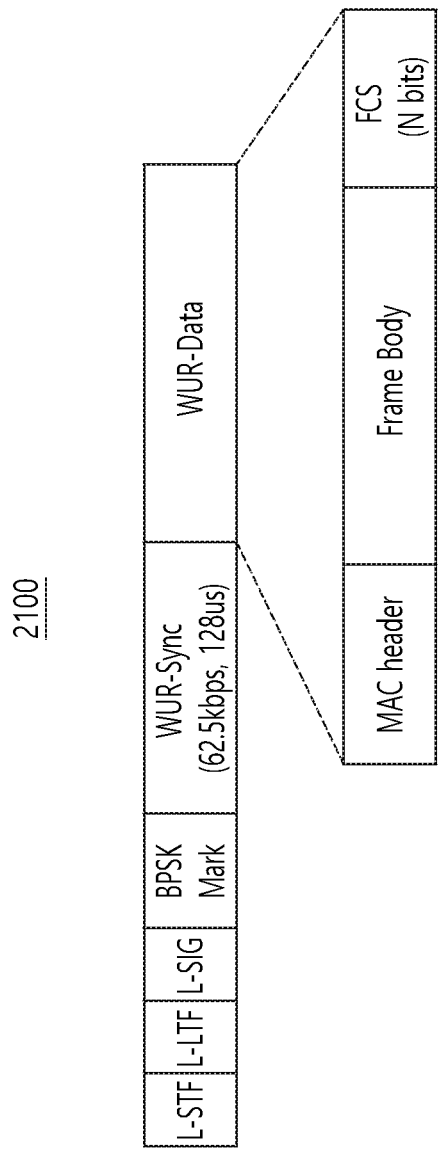
FIG. 21 and FIG. 22 illustrate an FCS field associated with a data rate applied to a wake-up packet according to an embodiment.
Figure 22:
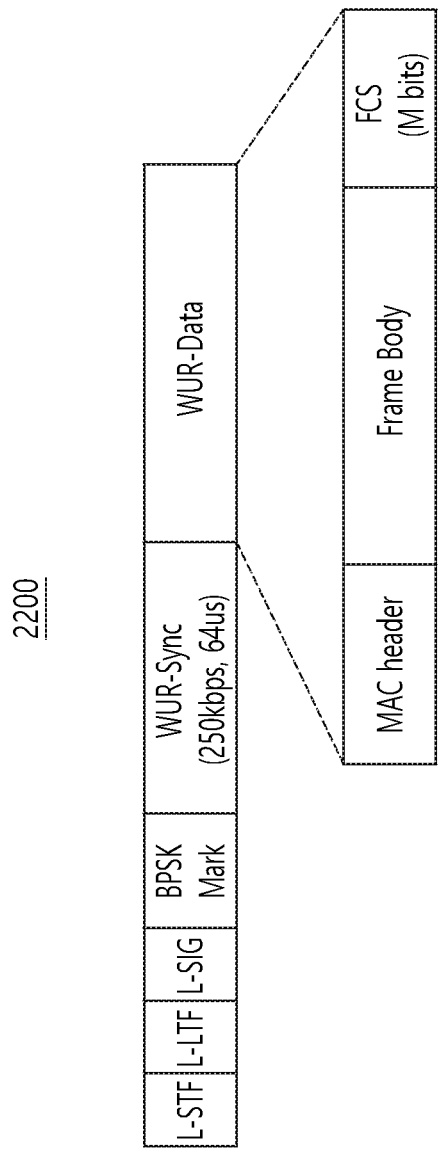

FIG. 21 and FIG. 22 illustrate an FCS field associated with a data rate applied to a wake-up packet according to an embodiment.

Referring to FIG. 21, a low data rate (LDR, 62.5 kbps) may be applied to a wake-up packet 2100 of FIG. 21. For example, an FCS field included in the wake-up packet 2100 of FIG. 21 may be configured with N bits.

Referring to FIG. 22, a high data rate (HDR, 250 kbps) may be applied to a wake-up packet 2200 of FIG. 22. For example, an FCS field included in the wake-up packet 2200 of FIG. 22 may be configured with M bits (M>N).

Referring to FIG. 21 and FIG. 22, according to the embodiment, in order to reduce overhead, the FCS field in the case of applying the LDR to the wake-up packet may be configured to have a shorter length than that in the case of applying the HDR the wake-up packet as illustrated in Table 4.

TABLE 4

| FCS size (bits) according to data rate | |
|---|---|
| 62.5 kbps (N) | 250 Kbps (M) |
| 8 | 32 |
| 8 | 16 |

TABLE 4-continued

| FCS size (bits) according to data rate | |
|---|---|
| 62.5 kbps (N) | 250 Kbps (M) |
| 16 | 32 |
| 4 | 32 |
| 4 | 16 |
| 4 | 8 |

Figure 23:
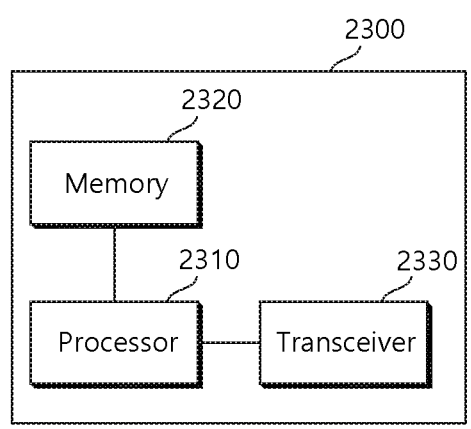
FIG. 23 is a block view illustrating a wireless device to which the exemplary embodiment of the disclosure can be applied.

FIG. 23 is a block view illustrating a wireless device to which the exemplary embodiment of the disclosure can be applied.

Referring to FIG. 23, as an STA that can implement the above-described exemplary embodiment, the wireless device may correspond to an AP or a non-AP station (STA). The wireless device may correspond to the above-described user or may correspond to a transmission device transmitting a signal to the user.

The wireless apparatus of FIG. 23, as shown, includes a processor 2310, a memory 2320 and a transceiver 2330. The illustrated processor 2310, memory 2320 and transceiver 2330 may be implemented as separate chips, respectively, or at least two blocks/functions may be implemented through a single chip.

The transceiver 2330 is a device including a transmitter and a receiver. If a specific operation is performed, only an operation of any one of the transmitter and the receiver may be performed or operations of both the transmitter and the receiver may be performed. The transceiver 2330 may include one or more antennas for transmitting and/or receiving a radio signal. Furthermore, the transceiver 2330 may include an amplifier for amplifying a received signal and/or a transmission signal and a bandpass filter for transmission on a specific frequency band.

The processor 2310 may implement the functions, processes and/or methods proposed in this specification. For example, the processor 2310 may perform the above-described operations according to the present embodiment. That is, processor 2310 may perform the operations disclosed in the embodiments of FIG. 1 to FIG. 22.

The processor 2310 may include application-specific integrated circuits (ASIC), other chipsets, logic circuits, data processors and/or a converter for converting a baseband signal into a radio signal, and vice versa. The memory 2320 may include a read-only memory (ROM), a random access memory (RAM), a flash memory, a memory card, a storage medium and/or other storage devices.

In a detailed description of the present specification, specific embodiments have been described, but various modifications are possible without departing from the scope of the present specification. Therefore, the scope of the present specification should not be limited to the above-described embodiments, but should be determined not only by the claims below but also by the equivalents of the claims of the present specification.

What is claimed is:

1. A method for communication performed by a first wireless terminal in a wireless local area network (WLAN) system, the method comprising:
generating a wake-up packet modulated by an on-off keying (OOK) scheme, the wake-up packet comprising a frame check sequence (FCS) field having a fixed length regardless of a presence of a frame body in the wake-up packet, and the fixed length being two bytes; and transmitting the wake-up packet to a plurality of second wireless terminals, wherein, when the wake-up packet comprises broadcast identification information or group identification information for the plurality of second wireless terminals, the wake-up packet has a constant length, and wherein, when the wake-up packet comprises a plurality of pieces of unicast identification information for the plurality of second wireless terminals, the wake-up packet has a variable length which is determined based on a number of the plurality of second wireless terminals.

2. A first wireless terminal for performing a method for communication in a wireless local area network (WLAN) system, the first wireless terminal comprising:

a transceiver to transmit and receive a radio signal; and
a processor connected to the transceiver,
wherein the processor is configured to:

generate a wake-up packet modulated by an on-off keying (OOK) scheme, the wake-up packet comprising a frame check sequence (FCS) field having a fixed length regardless of a presence of a frame body in the wake-up packet, and the fixed length being two bytes; and transmit the wake-up packet to a plurality of second wireless terminals, wherein, when the wake-up packet comprises broadcast identification information or group identification information for the plurality of second wireless terminals, the wake-up packet has a constant length, and wherein, when the wake-up packet comprises a plurality of pieces of unicast identification information for the plurality of second wireless terminals, the wake-up packet has a variable length which is determined based on a number of the plurality of second wireless terminals.

* * * * *